(12) United States Patent
Tian et al.

(10) Patent No.: US 10,503,628 B2
(45) Date of Patent: Dec. 10, 2019

(54) INTERPOLATION BASED PATH REDUCTION METHOD IN SOFTWARE MODEL CHECKING

(71) Applicant: Xidian University, Xi'an (CN)

(72) Inventors: Cong Tian, Xi'an (CN); Zhao Duan, Xi'an (CN); Zhenhua Duan, Xi'an (CN)

(73) Assignee: XIDIAN UNIVERSITY, Xi'An (CN)

( * ) Notice: Subject to any disclaimer, the term of this patent is extended or adjusted under 35 U.S.C. 154(b) by 0 days.

(21) Appl. No.: 15/912,588

(22) Filed: Mar. 6, 2018

(65) Prior Publication Data
US 2019/0095314 A1    Mar. 28, 2019

(30) Foreign Application Priority Data
Sep. 28, 2017  (CN) .......................... 2017 1 0896756

(51) Int. Cl.
*G06F 11/36*    (2006.01)
(52) U.S. Cl.
CPC ............................... *G06F 11/3608* (2013.01)
(58) Field of Classification Search
None
See application file for complete search history.

(56) References Cited

U.S. PATENT DOCUMENTS

| | | | | |
|---|---|---|---|---|
| 7,587,707 B2* | 9/2009 | Ball | ............... | G06F 11/3608 717/106 |
| 7,930,659 B2* | 4/2011 | Ivancic | ............... | G06F 11/3608 716/100 |
| 8,005,661 B2* | 8/2011 | Ganai | ............... | G06F 17/504 703/2 |
| 9,098,620 B2* | 8/2015 | Zhou | ............... | G06F 11/3608 |
| 9,141,354 B2* | 9/2015 | Kuznetsov | ............... | G06F 8/42 |
| 9,720,925 B1* | 8/2017 | Lawson | ............... | G06F 8/54 |

(Continued)

OTHER PUBLICATIONS

Albarghouthi, Aws, et al. "Ufo: A framework for abstraction-and interpolation-based softwareverification." International Conference on Computer Aided Verification. Springer, Berlin, Heidelberg, 2012. (Year: 2012).*

(Continued)

*Primary Examiner* — Matthew J Brophy
(74) *Attorney, Agent, or Firm* — Gokalp Bayamoglu

(57) ABSTRACT

A method for model checking path reduction based on interpolation comprises: reading a C program, performing grammatical and semantic analysis on the C program, and extracting CFG from an abstract syntax tree; adding safety (S) interpolation and error (E) interpolation to the CFG and extending the CFG; in a process of generating ARG according to the CFG, determining, in each state, whether the safety interpolation and the error interpolation are implied by current path formula. The method improves the verification efficiency by computing the S interpolation and the E interpolation, which makes the algorithm of the model checking a better use in large-scale programs. The S interpolation can be used to avoid the unnecessary traversal, greatly reducing the number of ARG state. The E interpolation can be used to quickly determine whether there is a true counterexample in the program, accelerating the program's verification and improving the efficiency.

14 Claims, 10 Drawing Sheets

Reading a C program, performing grammatical and semantic analysis on the C program and extracting Control Flow Graph (CFG) from an abstract syntax tree — S101

Adding safety interpolation and error interpolation to the CFG and extending the CFG — S102

In a process of generating Abstract Reachability Graph (ARG) according to the CFG, determining, in each state, whether the safety interpolation and the error interpolation are implied by current path formula — S103

(56) References Cited

U.S. PATENT DOCUMENTS

| | | | | |
|---|---|---|---|---|
| 2006/0282807 A1* | 12/2006 | Ivancic | ............... | G06F 11/3608 |
| | | | | 716/106 |
| 2007/0005633 A1* | 1/2007 | Ball | .................... | G06F 11/3608 |
| 2008/0281563 A1* | 11/2008 | Ganai | ................. | G06F 11/3608 |
| | | | | 703/2 |
| 2009/0282289 A1* | 11/2009 | Nori | .................... | G06F 11/3608 |
| | | | | 714/38.1 |
| 2013/0304755 A1* | 11/2013 | Zhou | ................... | G06F 11/3608 |
| | | | | 707/758 |
| 2014/0244645 A1* | 8/2014 | Muske | ............... | G06F 9/44589 |
| | | | | 707/737 |
| 2017/0212829 A1* | 7/2017 | Bales | ................. | G06F 11/3664 |

OTHER PUBLICATIONS

Albarghouthi, Aws, Arie Gurfinkel, and Marsha Chechik. "Whale: An interpolation-based algorithm for inter-procedural verification." International Workshop on Verification, Model Checking, and Abstract Interpretation. Springer, Berlin, Heidelberg, 2012. (Year: 2012).*
Kroening, Daniel, and Georg Weissenbacher. "Interpolation-based software verification with Wolverine." International Conference on Computer Aided Verification. Springer, Berlin, Heidelberg, 2011 (Year: 2011).*

* cited by examiner

```
1:  /*****Exa.c*****/
2:  int main(){
3:    int s=1, a, i;
4:    if(a==1){
5:      if(i>1)
6:        s=s+2;
7:      else
8:        s=s+3;
9:    }else{
10:     if(i>1)
11:       s=s+1;
12:     else
13:       s=s+2;
14:   }
15:   if(s>3)
16:     Error; return -1;
17:   return 0;
18: }
```

```
1:  /****weight.c****/
2:  int main(){
3:    int s,a=1;
4:    if(s>1)
5:      a=a+2;
6:    else
7:      a=a+1;
8:    if(a<3)
9:      a=2;
10:   if(a>2)
11:     ERROR: return 0;
12:   else
13:     goto ERROR;
14:   return 0;
15: }
```

INTERPOLATION BASED PATH REDUCTION METHOD IN SOFTWARE MODEL CHECKING

CROSS REFERENCE TO RELATED APPLICATIONS

This application is based upon and claims priority to Chinese Patent Application No. 201710896756.2, filed on Sep. 28, 2017, the entire contents of which are incorporated herein by reference.

TECHNICAL FIELD

The present invention relates to the field of computer application technology, specifically to an interpolation based path reduction method in software model checking.

BACKGROUND OF THE INVENTION

With the rapid development of science and technology and the continuous improvement of industrial demand, the complexity of various software and hardware designs is also increasing day by day, and the requirements for reliability and safety are continuously increasing. The reliability, safety, and correctness of the system have drawn wide attention from the scientific and industrial fields. Formal verification and testing are the main solutions to this problem. Formal verification methods began with Floyd, Hoare, and Manna's research in program specification and verification in the late 1960s. Model Checking proposed in the early 1980s belongs to a model-based formal verification method. It has a relatively simple idea and a high degree of automation and can be widely used in the verification of hardware circuit systems and network protocol systems. Model checking works as the following: making the system as a finite state transition system, using tense logic to describe verification specification, performing an exhaustive search on the finite state transition system to determine whether the specification is satisfied, and if not, giving counterexamples indicating why unsatisfied. Model checking faces the problem of state space explosion. The so-called state explosion problem means that the number of the system states increases exponentially with the increase of system scale. So researchers in this field use various methods to reduce the searching state space, and the Counterexample-Guided Abstraction Model Checking is a commonly used technique. Counterexample-Guided Abstraction Refinement (CEGAR) technique is based on the following: firstly, generating an abstract model by an abstract method when giving a model and its properties. Abstract models may contain more behavior than the original model, however, the structure and description of the abstract model is simpler than the original model, so it can alleviate state-space explosion problems. Secondly, invoking the model checker to check the formula's validity in the abstract model. If valid, the procedure is terminated; otherwise, giving a counterexample. Thirdly, reconstruction, that is, if a path in the original model corresponding to the counterexample path is successfully found, the procedure ends; otherwise, the counterexample path is a spurious one, when the next iteration process begins, an abstract model is regenerated and verified. Repeat this process until the return is valid or invalid, or the program stops caused by the state space explosion. Dynamic Symbolic Execution Technology is a test combining symbolic execution with concrete execution. Symbolic execution refers to representing the value of a program variable by a symbolic value on the premise of not executing the program, and then simulates program execution to perform the correlation analysis. First, build a Control Flow Graph (CFG) for the program to be analyzed, which is an abstract data structure inside a compiler that uses a digraph to represent a procedural process. In the CFG, simulation execution starts from the entry node. When reaching the branch nodes, the constraint solver can be used to determine which branch is feasible, and all the paths can be explored according to the pre-designed path scheduling strategy. Finally, the analysis result of each path is outputted. Dynamic Symbolic Execution takes a specific numeric value as input, starts the code simulation executor, and gathers all the symbolic constraints from the predicates of the branch statements in the current path. Then a new feasible path constraint is constructed by negating one branch of constraints, and a new feasible specific input is obtained by the constraint solver. Finally, the symbol execution engine performs a new round of analysis on the new input. By using the method generating new input through inputting iteratively, in theory, all possible paths can be calculated and analyzed. The main bottleneck of Dynamic Symbolic Execution Techniques is the path explosion problem, that is, as the number of branches in the program increases, the path increases exponentially. Interpolation is an effective method to alleviate the problem. It is substantially an idea of searching and pruning the branches, which marks feasible nodes for interpolation by using an infeasible path. Interpolation means the constraint that does not reach error locations. For a branch node, if each branch of the node is explored, the interpolant at the node is denoted as a full interpolant, otherwise denoted as a half interpolant. In Dynamic Symbolic Execution, if the path constraints from the start node to the current node satisfy the full interpolants of the current node, the path can be subsumed. That is, it cannot be explored, thus the path explosion problem can be effectively alleviated. For large-scale systems, the abstract model is refined repeatedly when it is verified and the more refinements, the more time it takes. Therefore, it's an urgent problem to find an effective method that can accelerate the verification of abstract model and verify a large-scale program.

In summary, the problem existing in the prior art is that for a large-scale system, the abstract model has too many refinements during verification, and the bottleneck of model checking is the state explosion, which consumes a large amount of memory and time and causes the verification crashes.

SUMMARY OF THE INVENTION

In view of the existing problems in the prior art, the present invention provides an interpolation based path reduction method in software model checking.

The present invention is implemented with an interpolation based path reduction method in software model checking. Said method comprises: inputting a C program, performing grammatical and semantic analysis for the C program, and extracting Control Flow Graph (CFG) from an abstract syntax tree; adding safety interpolation and error interpolation to the CFG and extending the CFG; in a process of generating Abstract Reachability Graph (ARG) according to the CFG, in each state, checking whether the safety interpolation and the error interpolation are implied by the current path formula.

Further, if the error interpolant of a certain state is implied, meaning that there is a true counterexample path in the program and the program is not safe, then verification is ended; if the safety interpolant is implied, meaning that all subsequent paths of the state are safe and no traversal is needed such that the explored paths are reduced; if a spurious counterexample path is found, then the safety interpolant and the error interpolant are calculated and updated according to Craig interpolation.

Further, the interpolation based path reduction method in software model checking includes the following steps:

step 1: generating the CFG according to a program to be verified, and adding 3 attributes for the nodes in the CFG: R interpolation, S interpolation and E interpolation, where R interpolation is a reachable constraint for determining reachability of a state, S interpolation and E interpolation are path specifications for accelerating the verification; adding an attribute W for an edge of the CFG, where the value of W for an edge represents the number of branches that have not been traversed in a sub-graph that is rooted at the node pointed by the edge;

step 2: generating the ARG according to the generated CFG; if a new state s is generated along a path and the R interpolation corresponding to s is satisfied, meaning that the state s is reachable, then traversal of the path along the state s is continued; otherwise, the state s is unreachable, then the path is terminated and other paths are traversed; for a reachable state s, if the E interpolation corresponding to the state s is implied by the path formula corresponding to the path, meaning that there is a counterexample path from the state s to a target state and the program is unsafe; if the S interpolation corresponding to the state s is implied, meaning that all the paths starting from this state are safe and there is no need to explore the program along the state s; if the state s is reachable and the E interpolation and S interpolation are not implied, then traversing the path along state s is continued;

step 3: if a counterexample path is found in the process of generating ARG, then checking whether the counterexample path is spurious; if the counterexample path is spurious, meaning that the program is unsafe; otherwise, refining the model according to the spurious counterexample, updating the R interpolation, the S interpolation and the E interpolation of the corresponding state, and then regenerating the ARG until a real counterexample path is found or no counterexample paths exist.

Further, as described in step 1, generating the CFG of the program to be verified and initializing the attributes of the nodes and the edges, including the following steps:

(1) finding the target node in the CFG, reversely traversing the CFG from the target node, and then retaining traversed nodes and edges and removing untraversed nodes and edges;

(2) obtaining pruned CFG, and initializing the value of the attributes and three kinds of interpolations for each node. An initial value of the R interpolant for each node is {true} when generating initially the ARG by traversing the CFG; the S interpolant is defined as a two-tuple: $(F, I_s)$ where the range of F is {full, half}, the value of $I_s$ is a conjunction of predicates; for a node l, if l has no successors or the S interpolants of all successor nodes are full, which is denoted as f, it means that all successor nodes of l are traversed, and then the S interpolant at l is also full; otherwise, the S interpolant at l is half which is denoted as h; the form of F(l) is as follows:

$$F(l) = \begin{cases} \text{full} & \text{if } l \text{ has no successors or the } S \\ & \text{interpolants of all successors are full} \\ \text{half} & \text{otherwise} \end{cases}$$

If l is an endpoint, the initial value of the S interpolant is (full, true), meaning that the path is certainly safe if the endpoint is reached; if l is the target node, the value of the S interpolant is (full, false), meaning that the path is a counterexample path if the target node is reached; for other nodes, the S interpolants are (half, true), the form of $I_s(l)$ is as follows:

$$I_s(l) = \begin{cases} (\text{full, false}) & \text{if } l \text{ is the target node} \\ (\text{full, true}) & \text{if } l \text{ is the endpoint} \\ (\text{half, true}) & \text{otherwise} \end{cases}$$

If l is the target node, the initial value of the E interpolant is true, meaning that the path is certainly a real counterexample; if l is the endpoint, the initial value of the E interpolant is false, meaning that the path is certainly unable to reach the target node; for other nodes, the E interpolants are false, initially considered as being unable to reach the target node; for W attribute of each edge, the initial value is $\perp$, meaning that the traversal has not started, where the range of W is {N+,$\perp$}, N+ is a set of positive integers.

Further, in step 2, the W attribute is used to determine the traversal order of the branch edges. Meanwhile, the verification efficiency is improved by using the S interpolation and E interpolation. The specific steps include:

(1) obtaining a reachable state s', and producing successor states according to transition relationship of the CFG; if there are multiple possible successors, determining the order by the value of W of the edges where the priority of the value of W of the edge is: (>0)>$\perp$>0; for multiple edges that have the same value of W, the selection is conducted randomly; for a successor state s, if the state s is unreachable according to the R interpolation, the current path terminates and the process continues to traverse other paths; if the state s is reachable, checking whether the E interpolant of the state s is false; if it is false, meaning that the successor node of s[0] hasn't been traversed, then the next step turns to (2); otherwise, firstly using SSA principle to assign each variable no more than once to obtain the path formula from the initial state $s_0$ to s where this path formula is denoted as $P_f(s_0, \ldots, s)$; then, checking whether the E interpolant at s is implied in $P_f(s_0, \ldots, s)$ by using a solver; if the E interpolant is implied, meaning that a real counterexample exists in the program and the program is unsafe, then the verification path terminates; otherwise, the process turns to (2);

(2) checking whether the S interpolant of s is full interpolant; if the S interpolation is not full, the next step turns to (3); if the S interpolation is full, the path formula from the initial state $s_0$ to s is obtained, denoted as $P_f(s_0, \ldots, s)$; then checking whether the S interpolant of s is implied by $P_f(s_0, \ldots, s)$ by using a solver; if it is implied, all paths starting with s are safe and there is no need to traverse, then the current path terminates and the process continues to traverse other paths;

(3) determining whether s is the target state; if s is the target state, meaning that a counterexample path is found, then turning to step 3 is executed; if s is not the target state, further checking whether s is covered by other states; if s is covered by other states, meaning that there is no need to explore the current path, then other paths are explored; otherwise, continuing to traverse the current path;

(4) if there is a reachable state that has not been traversed, turning to (1); otherwise, the program is safe and the verification terminates.

Further, the optimization strategies in step 3 include:

in step 1, the CFG of a program is generated, the nodes and edges that do not reach the target node are pruned.

in step 3, if a spurious counterexample path exists, both of the three interpolants and the W value of each edge are computed; then, in step 2, if a state has more than one successors, determining a traversal order of the successor states by the W value. Further, the steps of computing the interpolants and W attribute in step 3 include:

1) in the process of generating the ARG, a counterexample path path:$<s_0, e_0, s_1, \ldots, e_{n-1}, s_n>$ is found; then, checking whether the path is spurious by an SMT solver; if the path is not spurious, the program is unsafe and the verification ends; otherwise, turning to 2).

2) computing the R interpolant, for the state $s_i$, $0<i<n$, dividing path into two parts: pre and post where pre is $<s_0, \ldots, s_i>$ and post is $<s_i, \ldots, s_n>$; the new R interpolants are computed by Craig interpolation, Craig(pre, post). The update of the R interpolant of $s_i[0]$ is formally expressed as:

$$R\text{-}Intp(s_i[0]) = R\text{-}Intp(s_i[0]) \cup Craig(P_f(s_0, \ldots, s_i), P_f(s_i, \ldots, s_n))$$

where $P_f(s_0, \ldots, s_i)$ represents the path formula corresponding to the path from $s_0$ to $s_i$;

3) for computing the S interpolant, firstly, finding a maximal reachable sequence $\Pi = <s_0, \ldots, s_m>$, $0<m<n$, where the state $s_m$ is reachable and the state $s_{m+1}$ is unreachable; for each state $s_i$ of $\Pi$, $0<i\leq m$, checking whether the first element of the S interpolant is full or half; if the S interpolants of all successor nodes of $s_i[0]$ are full, then the S interpolant of $s_i[0]$ is full; otherwise, the S interpolant of $s_i[0]$ is half. The form of $F(s_i[0])$ is as follows:

$$F(s_i[0]) = \begin{cases} \text{full} & \text{if } s_i[0] \text{ has no successors or the } S \text{ interpolants of all successors are full} \\ \text{half} & \text{otherwise} \end{cases}$$

For the second element of the S interpolation as $I_s(s_i[0])$, if i=m, then $I_s(s_i[0])$ is the negation of the path formula of the edge $e_i$; if $0<i<m$, then $I_s(s_i[0])$ is computed by Craig interpolation, denoted as Craig(A, B), where A represents the path formula from $s_0$ to $s_i$, and B is the conjunction of the formula corresponding to the edge $e_i$ and the negation of S interpolant corresponding to the state $s_{i+i}$; the form of $I_s(s_i[0])$ is as follows:

$$I_s(s_i[0]) = \begin{cases} I_s(s_i[0]) \wedge Craig(A, B) & 0 < i < m \\ I_s(s_i[0]) \wedge \,!P_f(s_i, e_i, s_{i+1}) & i = m \end{cases}$$

where $A = P_f(s_0, \ldots, s_i)$, $B = P_f(s_i, e_i, s_{i+1}) \wedge !(I_s(s_{i+1}[0]))$, the interpolation of each state is computed in a reverse order from the state $s_m$ until the initial state is encountered or the S interpolant at a certain state is half;

4) for computing the E interpolant, finding the largest feasible suffix $\Pi = <s_i, \ldots, s_n>$, $0<i\leq n$; the E interpolants are computed in a reverse order from the state $s_i$ by Craig interpolation, denoted as Craig(A, B); for $s_i$, A is the conjunction of the path formula from $s_i$ to $s_n$ and the E interpolant of $s_n$, and B is the path formula from $s_0$ to $s_i$; for the state $s_j$, $0<j<i$, A is the conjunction of the path formula from $s_j$ to $s_{j+1}$ and the E interpolant of $s_{j+1}$, and B is the path formula from $s_0$ to $s_j$; the form of $I_e(s_j[0])$ is as follows:

$$I_e(s_j[0]) = \begin{cases} I_e(s_j[0]) \vee Craig(A_1, B_1), & j = i \\ \text{where } A_1 = P_f(s_j, \ldots, s_n) \wedge I_e(s_n[0]), & B = P_f(s_0, \ldots, s_j) \\ I_e(s_j[0]) \vee Craig(A_2, B_2), & 0 < j < i \\ \text{where } A_1 = P_f(s_j, \ldots, s_{j+1}) \wedge I_e(s_{j+1}[0]), & B = P_f(s_0, \ldots, s_j) \end{cases}$$

5) computing the W values of the edges, according to the counterexample path and the updated S interpolation, for an edge e: (s, op, s'), if the S interpolation of s' is full, then the W value of e is 0; if the S interpolation of s' is half and s' is the last reachable state, then the W value of e is the number of outgoing edges for s'[0] minus one; if the S interpolation of s' is half and s' is not the last reachable state, then the W value of e is a sum of the two parts: 1) the sum of the W values of edges whose values are not $\perp$ among outgoing edges of s'[0], 2) the number of the edges whose W values are $\perp$ among outgoing edges of s'[0] for the edge e:(s, op, s'), the form of s':(l', c', p') is as follows:

$$W(e) = \begin{cases} 0 & \text{the } S \text{ interpolation of } l' \text{ is full} \\ |\{(l', -, -)|(l', -, -) \text{ is the edge of } l'\}| - 1 & s' \text{ is the last reachable state and the } S \text{ interpolation of } l' \text{ is half} \\ \sum_{W((l',-,-))\neq \perp} W((l', -, -)) + |\{(l', -, -)|W((l', -, -)) = \perp\}| & \text{otherwise} \end{cases}$$

6) turning to step 2 and regenerating the ARG.

Further, the steps of computing the largest feasible suffix in 4) include:

(1) for a counterexample path path: $<s_0, e_0, s_1, \ldots, e_{n-1}, s_n>$, the edges are divided into two categories: branch edge $E_b$ and non-branch edge $E_a$;

(2) the path formula is generated, where for $e \in E_b$, the corresponding formula is replaced by true, and for $e \in E_a$, its corresponding formula is generated and a new path formula $P_f$ is obtained;

(3) searching reversely from the edge $e_{n-1}$, if $e_{i_1} \in E_b$, $0<i_1<n$, then replacing true in the corresponding position in $P_f$ with the formula corresponding to $e_{i_1}$ for obtaining a new path formula $P_{f_1}$ and using an SMT solver to check whether $P_{f_1}$ is satisfiable; if $P_{f_1}$ is satisfied, then continuing to search for the next edge $e_{i_2}$, $0<i_2<i_1$, and replacing true in the corresponding position in $P_f$ with the formula corresponding to $e_{i_2}$ for obtaining a new path formula $P_{f_2}$ and using the SMT solver to check whether $P_f$ is satisfiable; the process is repeated until $P_f$ is unsatisfiable by SMT solver for $e_{i_m} \in E_b$, then the largest feasible suffix is $<s_{i_{m-1}}, e_{i_{m-1}}, s_{i_{m-2}}, \ldots, e_{n-1}, s_n>$.

Another purpose of the present invention is to provide a computer that uses interpolation based path reduction method in software model checking The advantages and beneficial effects of the present invention are as follows. The present invention makes the more use of the information provided by the spurious counterexample path in the model checking for improving the verification efficiency by computing the S interpolation and the E interpolation, which makes the model checking algorithm used better in large-scale programs. The S interpolation can be used to determine whether all possible paths rooted at one state are safe so as to avoid traversing these paths, which can greatly reduce the number of ARG states. The E interpolation can be used to quickly determine whether there is a real counterexample in the program, accelerating the program verification and improving the efficiency.

The present invention has carried out a large number of experiments on the proposed method and compared with the existing tools. Table 1 shows the experimental results of the existing tools. Here, column"# Suc" shows the number of programs that are successful verified by the corresponding tool. Column "Package-names" is the names of the testing program packages. Column "# Programs" gives the number of the programs contained in each package. It can be seen that among the four tools, CPAChecker (ABE), which only uses the R interpolation, has the highest success rate of 66.9%. Table 2 shows the experimental results of the proposed method of the present invention. Five modes are compared in the present invention: R+E, R+S, R+S+E, R+S+W and R+S+E+W. It can be seen that the success rates in the modes of R+E and R+S are 67.6% and 68.8%, respectively, which are 0.7% and 1.9% higher than those in R mode. The success rate of R+S+E mode is 69.3%, which are 1.7% and 0.5% higher than those in the modes of R+E and R+S, respectively.

TABLE 1

Test Data of the Existing Tools

| No. | Package-names | #Programs | #KLOC | CPAChecker(ABE) #Suc. | Smack + Corral #Suc. | SATABS #Suc. | UAutomizer #Suc. |
|---|---|---|---|---|---|---|---|
| 1 | Idv-linux-3.7.3 | 11 | 246.7 | 7 | 6 | 0 | 0 |
| 2 | Idv-challenges | 15 | 448.8 | 3 | 3 | 0 | 0 |
| 3 | Idv-validator-v0.6 | 21 | 212.8 | 10 | 13 | 2 | 0 |
| 4 | Idv-validator-v0.8 | 27 | 265.5 | 7 | 20 | 0 | 0 |
| 5 | Idv-linux-3.12-rcl | 40 | 478.2 | 11 | 28 | 5 | 0 |
| 6 | Idv-linux-3.0 | 41 | 755.2 | 25 | 35 | 15 | 13 |
| 7 | Idv-consumption | 163 | 2720.8 | 74 | 24 | 85 | 3 |
| 8 | Idv-commit-tester | 56 | 477.0 | 34 | 34 | 29 | 20 |
| 9 | Idv-linux-3.16-rcl | 159 | 2134.7 | 45 | 60 | 97 | 0 |
| 10 | Idv-linux-4.2-rcl | 432 | 1040.8 | 53 | 107 | 13 | 26 |
| 11 | Idv-linux-3.4-simple | 1163 | 40763.4 | 1155 | 1087 | 1099 | 689 |
| | Total | 2128 | 58543.7 | 1424 66.9% | 1417 66.6% | 1345 63.2% | 751 35.3% |

TABLE 2

Experimental Data

| | R(CPAChecker) | | R + E | | R + S | | R + S + E | | R + S + W | | R + S + E + W | |
|---|---|---|---|---|---|---|---|---|---|---|---|---|
| No. | #Suc. | #T.o. | #Suc. | #T.o. | #Suc. | #T.o. | #Suc. | #T.o. | #Suc. | #T.o. | #Suc. | #T.o. |
| 1 | 7 | 4 | 7 | 4 | 7 | 4 | 7 | 4 | 7 | 4 | 7 | 4 |
| 2 | 3 | 12 | 3 | 12 | 3 | 12 | 3 | 12 | 4 | 11 | 4 | 11 |
| 3 | 10 | 11 | 10 | 11 | 10 | 11 | 10 | 11 | 10 | 11 | 11 | 10 |
| 4 | 7 | 20 | 7 | 20 | 7 | 20 | 8 | 19 | 9 | 18 | 10 | 17 |
| 5 | 11 | 29 | 12 | 28 | 13 | 27 | 12 | 28 | 15 | 25 | 16 | 24 |
| 6 | 25 | 16 | 25 | 16 | 25 | 16 | 30 | 10 | 25 | 16 | 29 | 11 |
| 7 | 74 | 89 | 74 | 89 | 76 | 87 | 76 | 87 | 78 | 85 | 77 | 86 |
| 8 | 34 | 22 | 39 | 17 | 39 | 17 | 41 | 15 | 39 | 17 | 40 | 16 |
| 9 | 45 | 114 | 48 | 111 | 67 | 92 | 68 | 91 | 76 | 83 | 79 | 80 |
| 10 | 53 | 379 | 58 | 374 | 61 | 371 | 64 | 368 | 78 | 354 | 80 | 350 |
| 11 | 1155 | 8 | 1156 | 7 | 1155 | 8 | 1156 | 7 | 1157 | 6 | 1157 | 6 |
| Total | 1424 | 704 | 1439 | 689 | 1463 | 665 | 1475 | 653 | 1498 | 630 | 1510 | 618 |
| | 66.9% | 33.1% | 67.6% | 32.4% | 68.8% | 31.2% | 69.3% | 30.7% | 70.4% | 29.6% | 71% | 29% |

The present invention prunes the useless nodes and edges in the CFG, further reduces the state space, and adds the W attribute on the edge of the CFG so as to further improve the efficiency of program verification. In Table 2, the success rate of mode of R+S+W is 0.6% higher than that of R+S. the success rate of the mode of R+S+E+W is 0.7% higher than that of R+S+E.

Table 3 compares the time consumption. It can be seen that R+S+E+W mode consumes the least time, 10.8% less than R mode (1-$T_{RSEW}/T_R$). R+S+E mode consumes less time than both R+E and R+S mode. R+S+W mode consumes less time than R+S.

By computing the S interpolation and the E interpolation, the invention reduces the path search space during the verification of the abstract model, which alleviates the state explosion problem and accelerates the verification efficiency. Meanwhile, two kinds of optimization operations are provided to make the verification process more efficient, leading to a better application to large-scale programs. It is mainly used in formal verification of the correctness of software and hardware systems designed in the fields of industry, military, agriculture and scientific research, as well as the safety and reliability of various types of communication protocols.

FIG. 8 is a schematic diagram of the traversal paths after pruning the CFG in Embodiment 1 provided by the embodiment of the present invention.

FIG. 9 is a schematic diagram of the verifying program weight.c and its CFG of Embodiment 2 provided by the embodiment of the present invention.

FIG. 10 is a schematic diagram of the process of traversing CFG under the W attribute in Embodiment 2 provided by the embodiment of the present invention.

DETAILED DESCRIPTION OF THE INVENTION

To make the purpose, technical solutions and advantages of the present invention more comprehensible, the present invention will be further described in detail with reference to the following embodiments. It should be noted that the specific embodiments described herein are merely used to explain the present invention, and are not intended to limit the present invention.

The present invention reduces the path space of the verification of the abstract model by using the S interpolation and the E interpolation, which accelerates the abstract model verification and makes the verification of complex

TABLE 3

Time Comparison

| No. | Time consumption (s) | | | | | |
| --- | --- | --- | --- | --- | --- | --- |
|  | R | R + E | R + S | R + S + E | R + S + W | R + S + E + W |
| 1 | 3950.1 | 3872.7 | 4582.1 | 4675.7 | 4511.7 | 4568.5 |
| 2 | 10951.6 | 10935.6 | 10944.5 | 10960.6 | 10025.3 | 100293 |
| 3 | 10559.1 | 10355.3 | 10533.5 | 9863.3 | 10735.2 | 9877.5 |
| 4 | 18421.5 | 18423.6 | 18418.6 | 17629.2 | 17069.7 | 16216.5 |
| 5 | 26510.1 | 25927.6 | 25210 | 25514.3 | 23058.4 | 22221.5 |
| 6 | 14586.6 | 14617.1 | 14606.2 | 10198.9 | 15122.9 | 11260.5 |
| 7 | 82261.3 | 82035.2 | 80796.7 | 80852.4 | 79918.4 | 80698.6 |
| 8 | 20105.1 | 15799.5 | 15752.7 | 14077 | 15633.4 | 14828.7 |
| 9 | 105364.2 | 102110.2 | 84636.7 | 84086 | 77140 | 74989.9 |
| 10 | 344786.1 | 340653.6 | 339106 | 338033.6 | 325391.5 | 325703 |
| 11 | 8816.5 | 7822.3 | 8772.5 | 7894.1 | 6287.9 | 6273.6 |
| Total | 646312.2 | 632552.7 | 613359.5 | 603785.1 | 584894.4 | 576667.3 |

properties more convenient and effective, leading to a better application to large-scale programs. The invention is suitable for the detection of software system design defects and safety verification system in the fields of industry, agriculture, military, and scientific research.

The application principle of the present invention is described below in detail with reference to the drawings.

Figure 1:
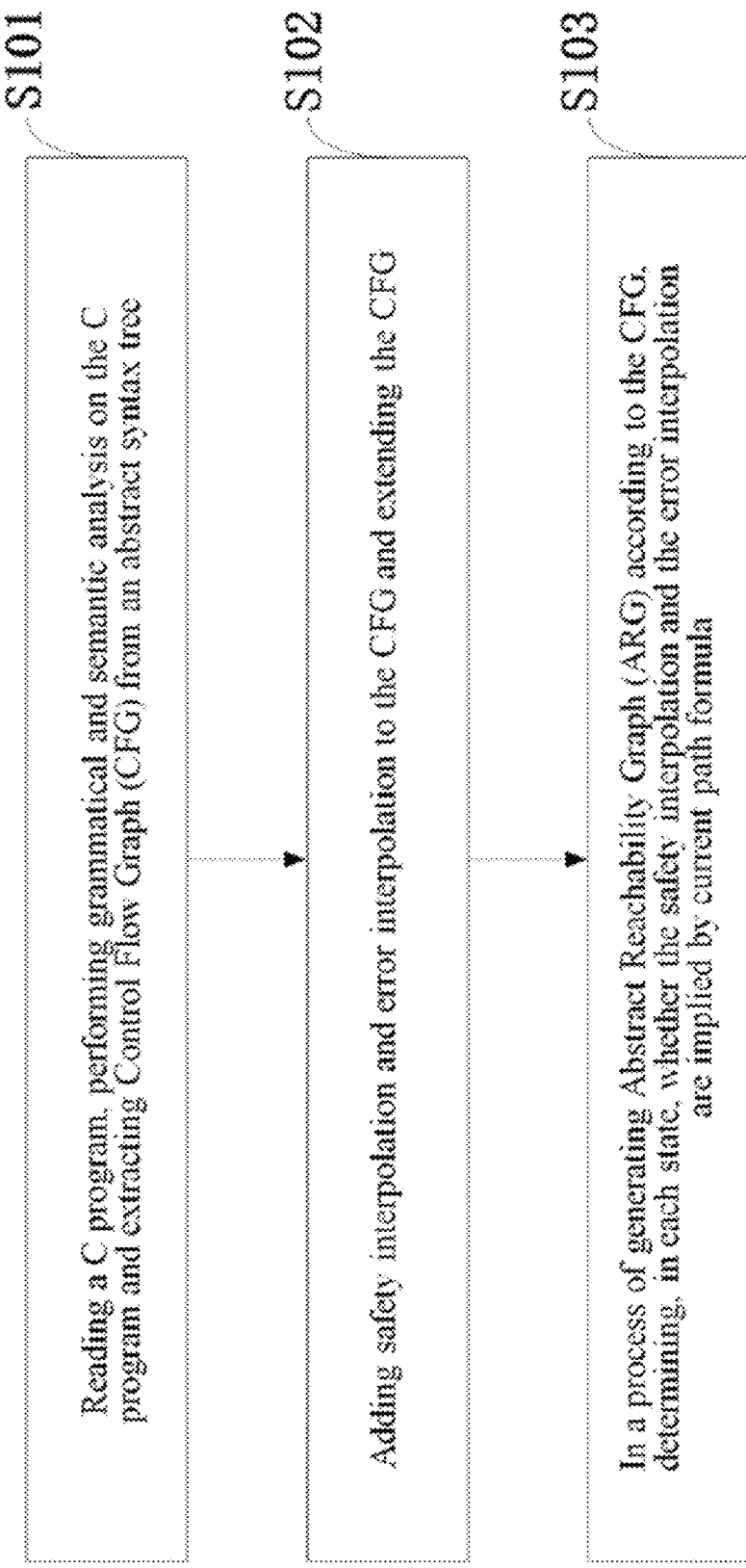
FIG. 1 is a flowchart of an interpolation-based method path reduction in model checking provided by the embodiment of the present invention.

As shown in FIG. 1, an interpolation-based path reduction method in model checking provided by the embodiment of the present invention includes the following steps:

S101: reading a C program, performing grammatical and semantic analysis on the C program, and extracting Control Flow Graph (CFG) from an abstract syntax tree;

S102: adding safety interpolation and error interpolation to the CFG and extending the CFG;

S103: in a process of generating Abstract Reachability Graph (ARG) according to the CFG, checking, in each state, whether the safety interpolation and the error interpolation are implied by the current path formula.

In the preferred embodiment of the present invention, in step S103: if the error interpolation of a certain state is implied, meaning that there is a real counterexample path in the program and the program is unsafe, then verification terminates; if the safety interpolation is implied, meaning that all paths rooted at the state are safe and no traversal is needed such that the traversal paths are reduced; if a spurious counterexample path is found, then the safety interpolation and the error interpolation are computed and updated according to Craig interpolation, ensuring the accuracy of verification.

The application principle of the present invention is further described below with reference to the drawings.

The present invention refers to the CEGAR-based model checking method, which uses the idea of the interpolations and classifies the traversal paths to reduce the generated state space and improve the verification efficiency so that it can be better used to verify large-scale programs.

A CFG is a control flow graph extracted from the abstract syntax tree by analyzing the grammar and semantics of the C program. A CFG is defined as a four-tuple (L, T, $l_0$, f), where L is the node set, l∈N corresponds to a program location. T is the set of transitions, and t∈T corresponds to a program operation. $l_0$∈N is the initial node, and f∈N the endpoint. A transition t is denoted as (l, op, l'), which means that l node reaches l' node through op operation, where op∈Ops corresponds to a concrete operation including an assignment operation, a conditional statement, a function call and a return statement.

The invention adds the corresponding attributes to the nodes and edges of the CFG. At a node l, three attributes: R interpolation, S interpolation, and E interpolation are added and denoted as l(R), l(S) and l(E), respectively. The attribute W is added to a transition t, denoted as t(W), which represents the weight value of t.

An ARG (Abstract Reachability Graph) is an abstract reachable graph, generated by unwinding the CFG. Given a CFG G=(L, T, $l_0$, f), an ARG A can be obtained, defined as ($S_A$, $E_A$), where $S_A$ is the set of states, $E_A$ is the set of edges. In an ARG, a state s∈$S_A$ has three parts: a node l in the CFG, the current call stack c (a sequence that consists of the nodes in the CFG, representing the return address) and the boolean formula p (also known as reachable region, a data set), denoted as s:(l, c, p). An edge e∈$E_A$ corresponds to a CFG edge, which may be a judgment predication, a function call or return statement, etc. For convenience, the definition is given as follow: for an n-tuple r($r_0$, $r_1$, . . . , $r_n$), r[i] represents the $i^{th}$ element of r, namely $r_i$. For example, for a state s:(l, c, p), s[0] is l, s[1] is c, and s[2] is p. For the states and s', if s[0]=s'[0], s[1]=s'[1] and s[2] implies s'[2], s' is covered by s, and there is no need to traverse the following paths of s'. A path π in the ARG is a finite alternating sequence of states and edges, representing an execution of the program, and denoted as <$s_0$, $e_0$, $s_1$, . . . , $e_{n-1}$, $s_n$>. The length of path π is defined as the number of edges.

Craig interpolation: Let ($\varphi_1$,$\varphi_2$) be a pair of formulas, and $\varphi_1 \wedge \varphi_2$ is unsatisfiable, then the interpolation of ($\varphi_1$,$\varphi_2$) is a formula φ that satisfies the following conditions:
1) $\varphi_1$ implies φ.
2) $\varphi \wedge \varphi_2$ is unsatisfiable.
3) φ just contains the common variables of $\varphi_1$ and $\varphi_2$.

An important property of Craig interpolation is that it reflects the reason why the two formulas are inconsistent, that is, the inconsistency of $\varphi_1$ and $\varphi_2$ is caused by φ.

The three interpolations in the embodiments of the present invention are all computed by Craig interpolation. The specific steps of the model checking include:

In step 1: first, the corresponding CFG is generated according to the program to be verified; then, strategy 1 is used to prune the CFG and the nodes and edges that are impossible to reach the target node are deleted to obtain a new CFG, and the attributes of each node and each edge are initialized. The specific steps are as follows.

In step 1.1: first, the target node is found in the CFG, and then, the CFG is reversely traversed from the target node. Finally, the traversed nodes and edges are retained, and those that are not traversed are removed.

In step 1.2: when the pruned CFG is obtained, the value of the attributes is initialized. First, three kinds of interpolations are initialized for each node. In the process of generating the ARG by initially unwinding the CFG, all the nodes are reachable. Hence, an initial value of R interpolant for each node is {true}. S interpolant is defined as a two-tuple: (F, $I_s$) where the range of F is {full, half}, and the value of $I_s$ is a conjunction consisting of predicates. For a node l, if l has no successors or the S interpolants of all successors are full, which are denoted as f, meaning that all successor nodes of l have been traversed, and then the S interpolant of l is also full; otherwise, the S interpolant of l is half which is denoted as h; the form of F(l) is as follows:

$$F(l) = \begin{cases} \text{full} & \text{if } l \text{ has no successors or the } S \\ & \text{interpolants of all successors are full} \\ \text{half} & \text{otherwise} \end{cases}$$

Therefore, if l is an endpoint, the initial value of the S interpolant is (full, true), meaning that the path is certainly safe if the endpoint is reached; if l is the target node, the value of the S interpolant is (full, false), meaning that the path is a counterexample path if the target node is reached; for other nodes, the initial values of the S interpolants are (half, true), the form of $I_s$(l) is as follows:

$$I_s(l) = \begin{cases} (\text{full, false}) & \text{if } l \text{ is the target node} \\ (\text{full, true}) & \text{if } l \text{ is the endpoint} \\ (\text{half, true}) & \text{otherwise} \end{cases}.$$

Since the E interpolant is used to determine whether there is a real counterexample, there is no need to ensure that all successors of a node l are traversed. Therefore, the E interpolant does not require a two-tuple. If l is a target node, then the initial value of the E interpolant is true, which means that the path is a real counterexample. If l is the endpoint, then the initial value of the E interpolant is false, which indicates that the path is unable to reach the target node. For other nodes, the initial values of the E interpolants are false, which is considered to be unable to reach the target node. For the W attribute of each transition, the initial value is ⊥, which means the traversal doesn't start, where the range of W is {N+,⊥}, and N+ is a set of positive integers.

In step 2: generating the ARG by unwinding the CFG, and checking whether a state is reachable by using the R interpolation in the process of exploring paths in the depth-first strategy; the W attribute of the edge is used to determine the traversal order; meanwhile, the verification efficiency is improved by using the S interpolation and the E interpolation; if there is no counterexample path, the program is safe, and the verification terminates; if there is a real counterexample according to the E interpolation, the program is unsafe, and the verification terminates; otherwise, a counterexample path is found, and further checking whether it is spurious, and the method turns to step 3. The specific steps are as follows.

In step 2.1: for a reachable state s', its successor states are generated according to transition relationship of the CFG. If there are more than one successors, the order is determined by the attribution W of the edge where the priority of the value of W of the edge is: $(>0)>\bot>0$, for the edges that have the same value of W, the selection is conducted randomly; for a successor state s, if the state s is unreachable according to the R interpolation, the current path ends and other paths are traversed; if the current state s is reachable, whether the E interpolant of the state s is false is checked; if the E interpolant of the states is false, it means that the successor node of s[0] hasn't been traversed, then the process turns to (2); if the E interpolant of the state s is not false, firstly, the SSA principle is used to assign each variable no more than once to obtain the path formula from the initial state $s_0$ to s, denoted as $P_f(s_0, \ldots, s)$; then checking whether $P_f(s_0, \ldots, s)$ implies the E interpolant of s by using SMT solver; if the E interpolation of s is implied, meaning that a real counterexample exists in the program and the program is not safe, then the verification ends; otherwise, the process turns to step 2.2.

In step 2.2: first, checking whether the S interpolation of s is full interpolation. If it is not full, the process turns to step 2.3; otherwise, the path formula from the initial state $s_0$ to s is obtained, denoted as $P_f(s_0, \ldots, s)$; then checking whether the S interpolation of s is implied by $P_f(s_0, \ldots, s)$. If the S interpolation of s is implied, all paths starting with s are safe and there is no need to traverse, then the current path ends and other paths are traversed.

In step 2.3: checking whether s is the target state. If s is the target state, meaning that a counterexample path is found, then the process turns to step 3; if s is not the target state, whether s is covered by other states is further determined; if s is covered by other states, there is no need to explore the current path, then other paths are traversed; otherwise, the traversal of current path will keep on.

In step 2.4: if there is a reachable state that has not been traversed, the process turns to step 2.1; otherwise, the program is safe and then the verification terminates.

In step 3: if step 2 returns a counterexample path, it's necessary to check whether it is spurious; if it is not a spurious counterexample, the program is unsafe, the verification is ended; otherwise, the values of the various attributes of the nodes and edges are further updated, and the ARG is regenerated.

In step 3.1: a counterexample path path:$<s_0, e_0, s_1, \ldots, e_{n-1}, s_n>$ is found in the process of generating the ARG; whether the path is spurious is determined by an SMT solver; if path is a real counterexample, the program is safe and the verification terminates; otherwise, the process turns to step 3.2.

In step 3.2: the R interpolant is computed, for the state $s_i$, $0<i<n$, and path is divided into two parts: pre and post where pre is $<s_0, \ldots, s_i>$ and post is $<s_i, \ldots, s_n>$; the new value of R interpolant is computed by Craig interpolation formula, Craig(pre, post), and the R interpolant of $s_i[0]$ is updated, formally expressed as:

$R\text{-}Intp(s_i[0]) = R\text{-}Intp(s_i[0]) \cup Craig(P_f(s_0, \ldots, s_i), P_f(s_i, \ldots, s_n))$ Where $P_f(s_0, \ldots, s_i)$ represents the path formula corresponding to the path from $s_0$ to $s_i$.

In step 3.3: the S interpolant is computed. Firstly, a maximal reachable sequence $\Pi=<s_0, \ldots, s_m>$, $0<m<n$, is found where the state $s_m$ is reachable and the state $s_{m+1}$ is unreachable; for each state $s_i$ of $\Pi$, $0<i\leq m$, whether the first element of the S interpolant is full or half is checked; if the S interpolants of all successor nodes of $s_i[0]$ are full, then the S interpolant of $s_i[0]$ is full. Otherwise, the S interpolant of $s_i[0]$ is half the form of $F(s_i[0])$ is as follows:

$$F(s_i[0]) = \begin{cases} \text{full} & \text{if } s_i[0] \text{ has no successors or the } S \text{ interpolants} \\ & \text{of all successors are full} \\ \text{half} & \text{otherwise} \end{cases}$$

The second element of the S interpolant is denoted as $I_s(s_i[0])$. Two cases exist. If i=m, then $I_s(s_i[0])$ is the negation of the path formula of the edge $e_i$; if $0<i<m$, then $I_s(s_i[0])$ is computed by Craig interpolation recorded as Craig(A, B) where A represents the path formula from $s_0$ to $s_i$, and B is the conjunction of the formula corresponding to the edge $e_i$ and the negation of the S interpolant at $s_{i+1}$; the form of $I_s(s_i[0])$ is as follows:

$$I_s(s_i[0]) = \begin{cases} I_s(s_i[0]) \wedge Craig(A, B) & 0 < i < m \\ I_s(s_i[0]) \wedge ! P_f(s_i, e_i, s_{i+1}) & i = m \end{cases}$$

where $A=P_f(s_0, \ldots, s_i)$, and $B=P_f(s_i, e_i, s_{i+1}) \wedge !(I_s(s_{i+1}[0]))$. The interpolant of each state is computed in a reverse order from the state $s_m$ until the initial state is encountered or the S interpolant at a certain state is half.

In step 3.4: for computing the E interpolant, the largest feasible suffix $\Pi=<s_i, \ldots, s_n>$, $0<i\leq 1$ is found, the E interpolant from the state $s_i$ is computed in reverse order by Craig interpolation, denoted as Craig (A, B); for $s_i$, A is the conjunction of the path formula from $s_i$ to $s_n$ and the E interpolant of $s_n$, and B is the path formula from $s_0$ to $s_i$. For the state $s_j$, $0<j<i$, A is the conjunction of the path formula from $s_j$ to $s_{j+1}$ and the E interpolant of $s_{j+1}$, and B is the path formula from $s_0$ to $s_j$. The specific form is as follows:

$$I_e(s_j[0]) = \begin{cases} I_e(s_j[0]) \vee Craig(A_1, B_1), & j = i \\ \text{where } A_1 = P_f(s_j, \ldots, s_n) \wedge I_e(s_n[0]), & B = P_f(s_0, \ldots, s_j) \\ I_e(s_j[0]) \vee Craig(A_2, B_2), & 0 < j < i \\ \text{where } A_1 = P_f(s_j, \ldots, s_{j+1}) \wedge I_e(s_{j+1}[0]), & B = P_f(s_0, \ldots, s_j) \end{cases}$$

Since the E interpolation is to determine whether there is a real counterexample path in all the possible subsequent paths of a state, the updated E interpolation is the disjunction of the new and the original interpolation.

In step 3.5: the W values of the edges are computed according to the counterexample path and the updated S interpolants. For an edge e: (s, op, s'), if the S interpolant of s' is full, then the W value of e is 0, if the S interpolant of s' is half, and s' is the last reachable state, then the W value of e is the number of outgoing edges for s'[0] minus one; if the S interpolant of s' is half and s' is not the last reachable state, then the W value of e is the sum of the following two parts: 1) the sum of the W values of edges whose values are not $\bot$ among outgoing edges of s'[0], 2) the number of the edges whose W values are $\bot$ among outgoing edges of s'[0]; for the edge e:(s, op, s'), the form of s':(l', c', p') is as follows:

$$W(e) = \begin{cases} 0 & \text{the } S \text{ interpolation of } l' \text{ is full} \\ |\{(l', -, -) \mid (l', -, -) \text{ is the edge of } l'\}| - 1 & \begin{array}{l} s' \text{ is the last reachable state and} \\ \text{the } S \text{ interpolation of } l' \text{ is half} \end{array} \\ \sum_{W((l',-,-)) \neq \bot} W((l', -, -)) + |\{(l', -, -) \mid W((l', -, -)) = \bot\}| & \text{otherwise} \end{cases}$$

In step 3.6: the process turns to step 2 to regenerate the ARG.

When the E interpolants are computed, the largest feasible suffix needs to be found. The specific steps are as follows:

In step 3.4.1: for a counterexample path path: $<s_0, e_0, s_1, \ldots, e_{n-1}, s_n>$, the edges are divided into two categories: branch edge $E_b$ and non-branch edge $E_a$.

In step 3.4.2: the path formula corresponding to path is generated where for $e \in E_b$, the corresponding formula is replaced by true, and for $e \in E_a$, its corresponding formula is generated. Thus, a new path formula $P_f$ is generated.

step 3.4.3: a reverse search is conducted from the edge $e_{n-1}$, if $e_{i_1} \in E_b$, $0 < i_1 < n$, then true in the corresponding position in $P_f$ is replaced with the formula corresponding to $e_{i_1}$ for obtaining a new path formula $P_f$, and an SMT solver is used to check whether $P_f$ is satisfiable. If $P_f$ is satisfiable, then the next edge $e_{i_2}$ continues to be searched for, $0 < i_2 < i_1$, and true in the corresponding position in $P_f$ is replaced with the formula corresponding to $e_{i_2}$ for obtaining a new path formula $P_f$, and the SMT solver is used to check whether $P_f$ is satisfiable; the process is repeated until $P_f$ is unsatisfiable by SMT solver for $e_{i_m} \in E_b$, then the largest feasible suffix is $<s_{i_{m-1}}, e_{i_{m-1}}, s_{i_{m-2}}, \ldots, e_{n-1}, s_n>$.

The application principle of the present invention is further described below with reference to specific embodiments.

The embodiments of the present invention are implemented on the CEGAR-based abstract model checking method. The steps of the present invention are specifically described in the following embodiments. The advantages of the present invention are illustrated by comparing the ARGs generated before and after using the S interpolation and the E interpolation.

Embodiment 1

Figure 2:
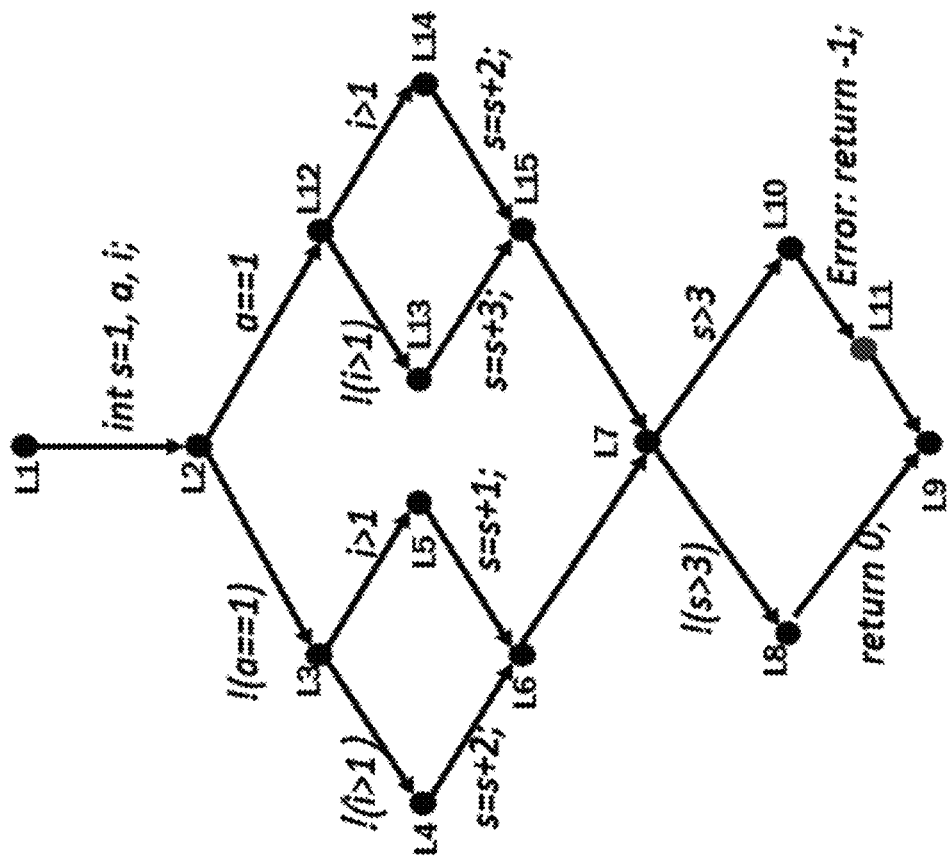
FIG. 2 is a schematic diagram of the verifying program Exa.c and its CFG of Embodiment 1 provided by the embodiment of the present invention.

FIG. 2 is the verified program Exa.c and its CFG where the target node is L11, and the endpoint is L9. Whether the program is safe is determined by verifying the reachability of the target node L11. If L11 is reachable, the program is unsafe. Otherwise, the program is safe. The specific steps of verification are as follows.

Figure 3:
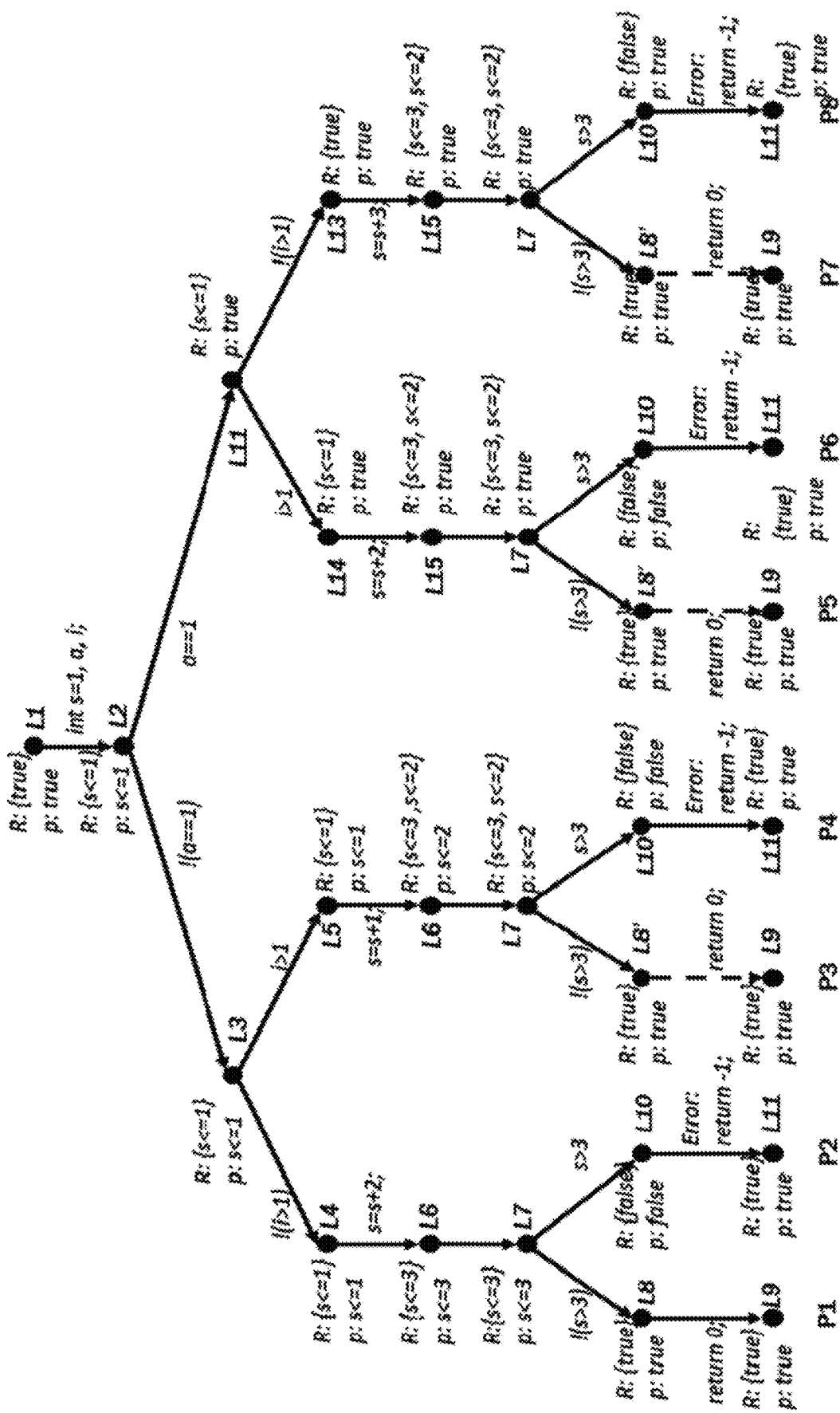
FIG. 3 is a schematic diagram of the traversal paths only under R interpolation in Embodiment 1 provided by the embodiment of the present invention.

The implementation of the present invention is based on the CEGAR abstraction model checking which determines the reachability of a state by abstract predicates, i.e., the R interpolation, so as to continually perform the process of counterexample-refinement-abstraction and accurately verify the program. To illustrate the differences and advantages of the R interpolation and the interpolations proposed by the present invention, the process using only the R interpolation is first introduced. FIG. 3 is the traversal path only under the R interpolation without the S interpolation and the E interpolation, where the states marked by "" means that the states are covered and there is no need to traverse the subsequent paths, the edges are represented by broken lines, and L11 is the target state. The specific steps are as follows.

In step 1: firstly, the CFG of the program is obtained. The initial values of the R interpolants of all the nodes are {true}. Then the initial state is obtained according to the initial node of the CFG. The ARG is generated by unwinding the CFG according to the depth-first strategy. Since the R interpolant of each node is {true}, each branch is considered reachable. When the program traverses along the leftmost path P1 in FIG. 2, it is found that P1 is not a counterexample path and other branches are traversed. When the target node L11 is reached, the counterexample path P2 is found, and the node sequence is: <L1, L2, L3, L4, L6, L7, L10, L11>.

In step 2: the path formula corresponding to the counterexample path is generated:

$$s_1 = 1 \wedge !(a_1 = 1) \wedge !(i_1 > 1) \wedge s_2 = s_1 + 2 \wedge \text{true} \wedge s_2 > 3 \wedge \text{true}$$

That the path formula is not satisfiable by using the SMT solver, since the formula $s_1 = 1 \wedge s_2 = s_1 + 2$ and $s_2 > 3$ are contradictory. So P2 is a spurious counterexample path. Then the R interpolation is computed by Craig(pre, post). For L10, pre is $s_1 = 1 \wedge !(a_1 = 1) \wedge !(i_1 > 1) \wedge s_2 = s_1 + 2 \wedge \text{true} \wedge s_2 > 3$, post is true, and the result obtained by the definition of Craig interpolation is false. For L7, pre is $s_1 = \wedge !(a_1 = 1) \wedge !(i_1 > 1) \wedge s_2 = s_1 + 2 \wedge \text{true}$, post is $s_2 > 3 \wedge$ true, the result obtained by the definition of Craig interpolation is $s_2 <= 3$, and the SSA mark is removed to obtain $s <= 3$. Hence. the R interpolant at each state in P2 is computed up to the root state.

In step 3: the ARG is regenerated by unwinding the CFG according to the new R interpolants. In FIG. 3, p of each state means the reachable region computed by using the R interpolation. If the reachable region is false, meaning that the state is unreachable and the current path terminates. Therefore, when L10 of P2 path is reached again, L10 is unreachable, so the target state cannot be reached, and other paths are explored. When exploring the CFG along the path P3, it is determined that L8 is covered by L8 in P1 by using the covering rule. Hence, P3 terminates. When the path P4 is explored, the counterexample path is found for the second time, the process turns to step 2. Step 3 and step 2 are repeated. When the path P8 is traversed, the counterexample path is found again. The SMT solver is used to determine that P8 is a real counterexample. Therefore, the program is unsafe and the verification terminates.

Figure 4:
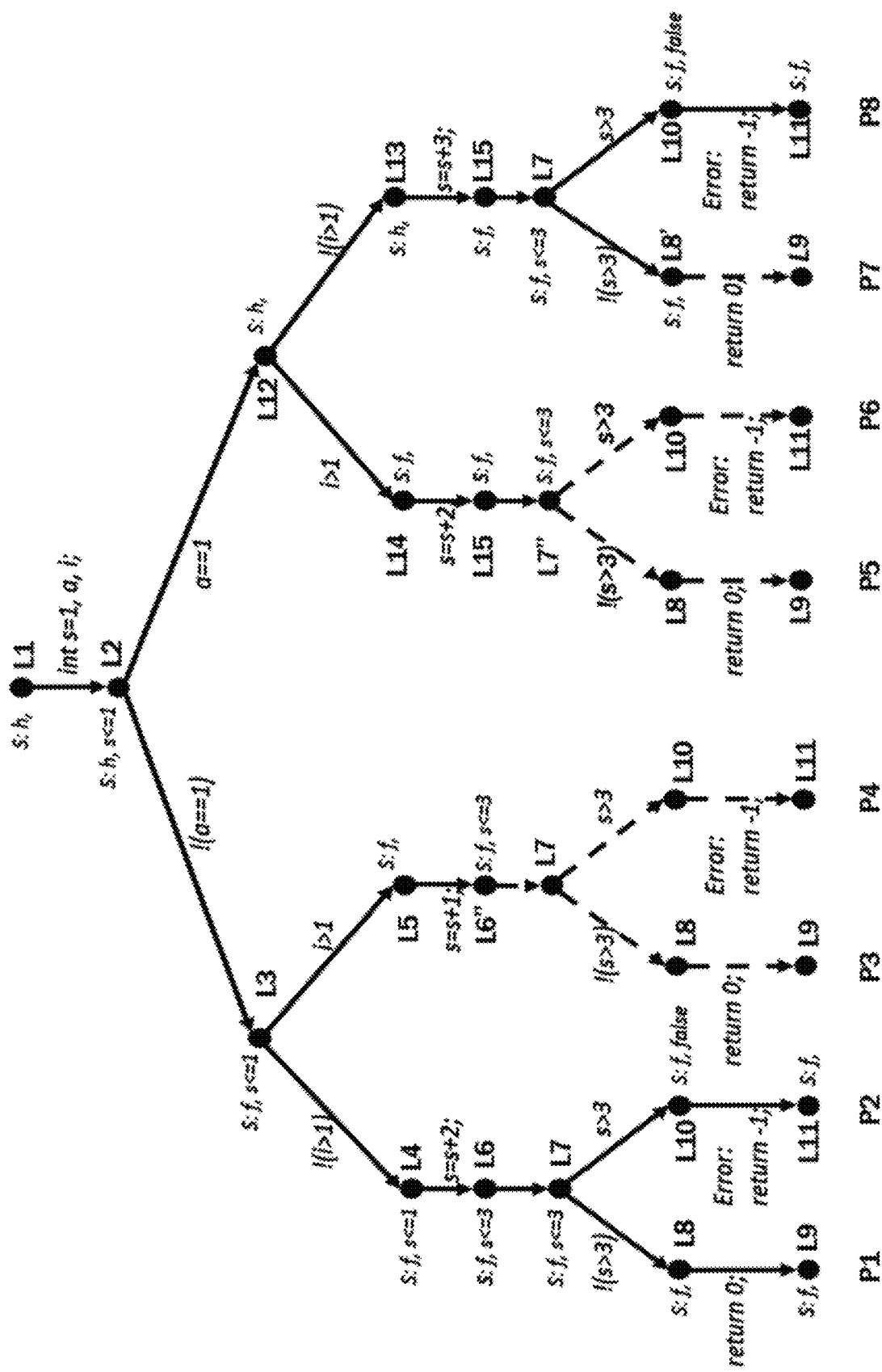
FIG. 4 is a schematic diagram of the traversal paths under R interpolation and S interpolation in Embodiment 1 provided by the embodiment of the present invention.

During the above model checking process, the algorithm proposed in the present invention uses the S interpolation and the R interpolation to classify the traversal paths, reduce the state space and improve the verification efficiency. The S interpolation can determine whether all possible paths rooted at a state are safe, thus avoiding exploring unnecessary paths and reducing state space. FIG. 4 depicts all paths traversed using the S interpolation on the basis of the R interpolation. When the S interpolation is added, the specific checking steps are as follows.

In step 1: firstly, the attributes of the nodes and edges in the CFG are initialized. The initial values of the R interpolants of all the nodes are {true}. The initial value of the S interpolant at the endpoint is (f, true). The initial value of the S interpolant at the target node is (f, false). The initial values of the S interpolants at the other nodes are (h, true). Since the initial values of the S interpolant are half, the first traversal is the same as the above process. When the program traverses along the leftmost path P1 in FIG. 4, it is found that P1 is not a counterexample path and other branches are explored. When the target node L11 is reached, the counterexample path P2 is found, and the state sequence is: <L1, L2, L3, L4, L6, L7, L10, L11>.

In step 2: the path formula corresponding to the counterexample path is generated:

$$s_1=1 \wedge !(a_1=1) \wedge !(i_1>1) \wedge s_2=s_1+2 \wedge \text{true} \wedge s_2>3 \wedge \text{true}$$

The path formula cannot be satisfied is determined by the SMT solver since the formula $s_1=1 \wedge s_2=s_1+2$ and $s_2>3$ are contradictory, so P2 is a spurious counterexample path. The update process of the R interpolation is the same as the above. Then, the corresponding S interpolation is computed, and the specific steps are as follows.

In step 2.1: first, the maximal reachable sequence 7C of the path P2 is obtained, and its state sequence is <L1, L2, L3, L4, L6, L7>. According to the update rule of the S interpolation, the $I_s$ value of the S interpolant at L7 is true$\wedge !(s>3)$, that is, $s<=3$. Since both successors of L7 have been traversed, the F-value of the S interpolant at L7 is full. Therefore, the S interpolation of L7 is (f, $s<=3$). For L6, since it has only one successor, which has been traversed, the F-value of the S interpolant at L6 is full. According to the update rule, the new $I_s$ value is:

$$\text{Craig}(s_1=1 \wedge !(a_1=1) \wedge !(i_1>1) \wedge s_2=s_1+2, \text{true} \wedge !(s_2<=3))=s_2<=3$$

Therefore, after updating, the S interpolant of L6 is (f, $s<=3$). The S interpolants of L4 and L3 are computed in sequence. Since L3 has a successor that has not been traversed, the S interpolant of L3 is (h, $s<=1$).

In step 3: the ARG is regenerated by unwinding the CFG according to the new R interpolation and S interpolation. When L6 is encountered along the path P3, since the S interpolant at L6 is full and $P_f(L1 \ldots, L6)$ implies $I_s(L6)$, that is $$F(L6)=\text{full and } (s_1=1 \wedge !(a_1=1) \wedge (i_1>1) \wedge s_2=s_1+1) \rightarrow s<=3$$

Therefore, it is sure that all paths rooted at L6 along P3 are safe and there is no need to traverse. Since all the successors of L3 are traversed, the interpolation of L3 is (f, $s<=3$). The S interpolant at L2 is (h, $s<=3$). The other paths are traversed until the real counterexample P8 is found.

In FIG. 4, when the S interpolation is used, there is no need to traverse all paths rooted at a state marked by "'''", which is expressed in broken line. Compared with the number of traversal paths in FIG. 3, the number of the traversal paths in FIG. 4 is less by 4, thus, the generated states are reduced.

Figure 5:
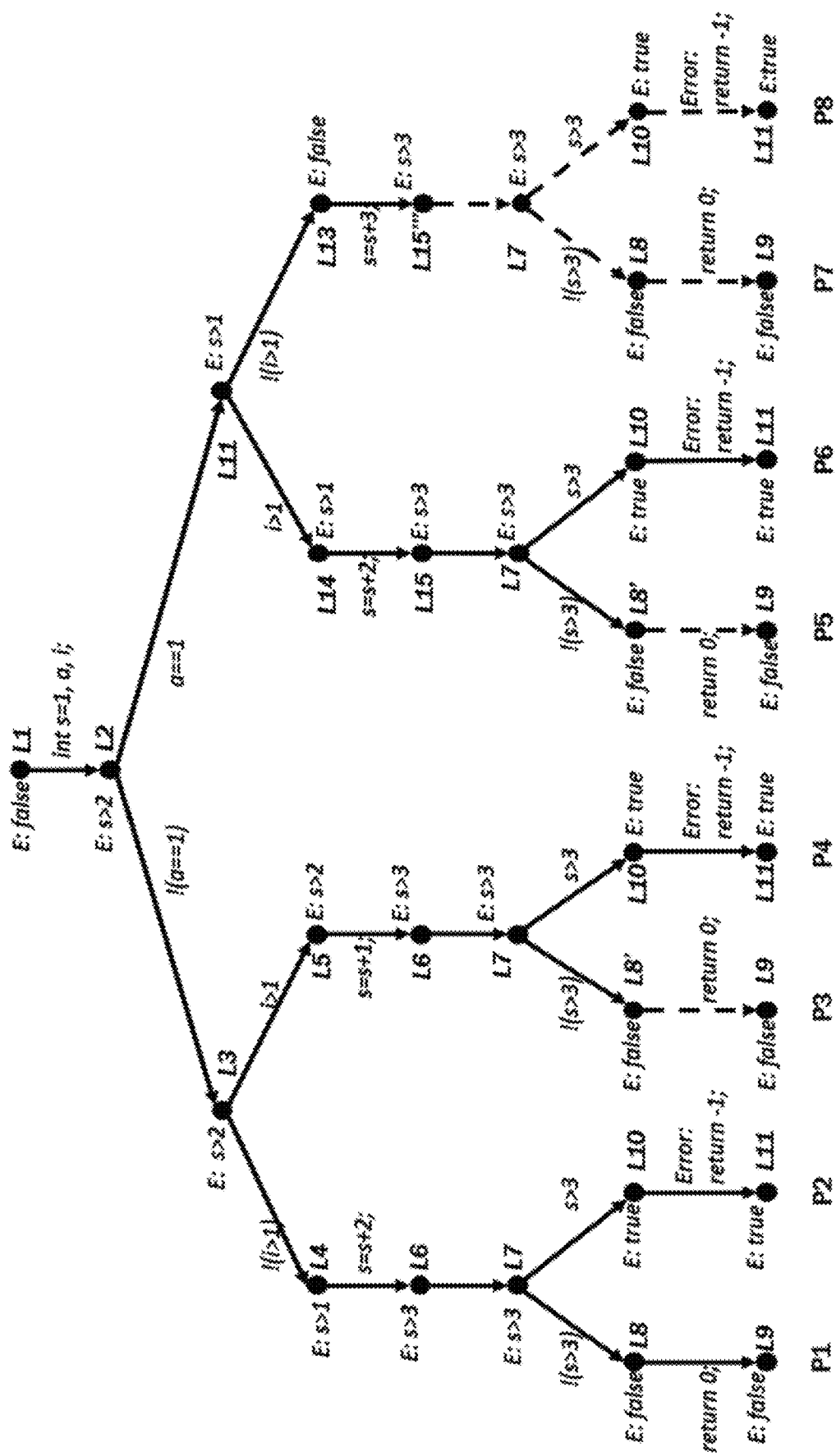
FIG. 5 is a schematic diagram of the traversal paths under R interpolation and E interpolation in Embodiment 1 provided by the embodiment of the present invention.

The present invention proposes the E interpolation, which can accelerate to find the counterexamples and improve the verification process. FIG. 5 depicts all paths traversed when using the E interpolation on the basis of the R interpolation. The specific steps are as follows.

In step 1: firstly, the attributes of the nodes and edges in the CFG are initialized. The initial values of the R interpolants of all the nodes are {true}. The E interpolant of the target node is true. The initial values of the E interpolants of the other nodes are false. The first traversal is the same as the above process. When the program traverses along the leftmost path P1 in FIG. 5, it is found that P1 is not a counterexample path and then other branches are traversed.

When the target node L11 is reached, the counterexample path P2 is found, the state sequence is: <L1, L2, L3, L4, L6, L7, L10, L11>.

In step 2: P2 is spurious by using the SMT solver, as like FIG. 4, and then the R interpolants are computed. Meanwhile, the E interpolants are computed. According to the update rule, the largest feasible suffix of P2: <L10, L11> is found. For L10, the new $I_e(L10)=$ $$\text{Craig}(\text{true} \wedge \text{true}, s_1=1 \wedge !(a_1==1) \wedge !(i_1>1) \wedge s_2=s_1+2 \wedge \text{true} \wedge s_2>3)=\text{true}$$

Therefore, after updating, the E interpolant at L10 is true. The E interpolants s of L7, L6, L4, L3, and L2 are computed in sequence. The results show in FIG. 5.

In step 3: the ARG is regenerated by unwinding the CFG is according to the new R interpolation and E interpolation. In the corresponding state, whether its E interpolant is implied is checked. As shown in FIG. 5, when L15 is reached along the path P7, the E interpolant at L15 is $s>3$. It can be obtained that $P_f(L1, L2, L11, L13, L15)$ implies $s>3$, that is:

$$(s_1=1 \wedge a_1=1 \wedge !(i_1>1) \wedge s_2=s_1+3) \rightarrow s>3$$

Therefore, there is a real counterexample path to the target state, the program is unsafe and the traversal terminates.

Figure 6:
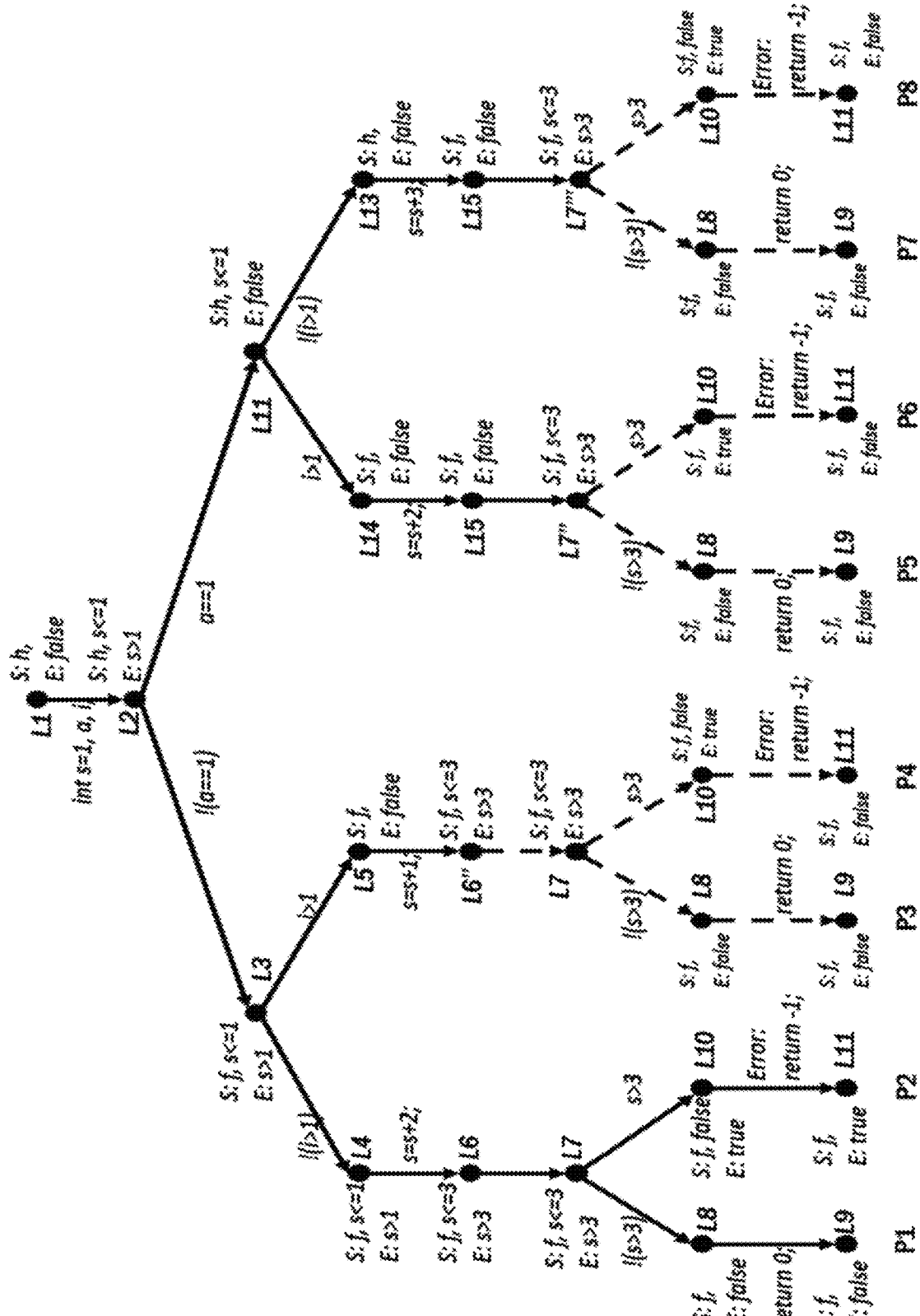
FIG. 6 is a schematic diagram of the traversal paths under R interpolation, S interpolation and E interpolation in Embodiment 1 provided by the embodiment of the present invention.

In FIG. 5, when using the E interpolation, there is no need to traverse paths rooted at a state marked by "'''". Therefore, the number of explored paths is less than that under only the R interpolation. FIG. 6 depicts the traversal paths when the three interpolations are used.

Figure 7:
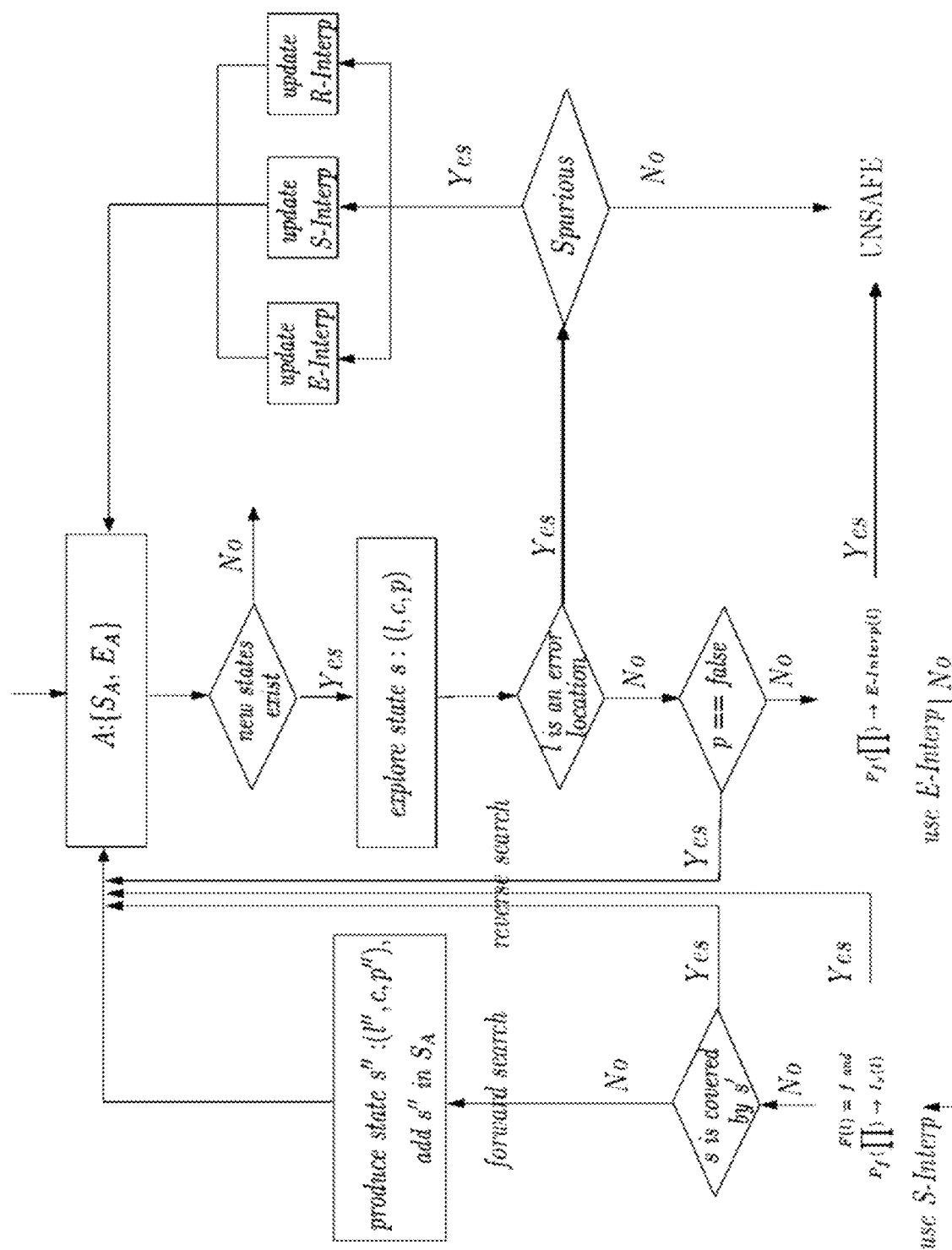
FIG. 7 is a schematic diagram of an overall process of program verification by using the three interpolations provided by the embodiment of the present invention.

By using the S interpolation and the E interpolation on the basis of the R interpolation, the invention reduces the traversal paths, which alleviates the state explosion problem, and accelerates the verification process both in time and space. The whole process is shown in FIG. 7, the specific steps are as follows:

For an ARG A:$(s_A, E_A)$, if there is no new state that has not been traversed, the program is safe. Otherwise, a new state s is selected to traverse. If s is the target state, the current path is counterexample path, and whether it is spurious is checked by the SMT solver. If it is not spurious, the program is unsafe. Otherwise, the three interpolations are computed. Then, the ARG is regenerated. If s is not the target state and reachable, whether there is a real counterexample is determined by using the E interpolation of s. If the E interpolation of s is implied, the program is unsafe. Otherwise, whether it is necessary to traverse the current path along s is determined by using the S interpolation of s. If the S interpolation of s is implied, it is not necessary, and other paths will be traversed. Otherwise, whether s is covered is then determined. If s is covered, it is also not necessary to continue the traversal along s. Otherwise, the traversal along the state s will continue. The above process is repeated until it is verified that the program is safe or unsafe.

Figure 8:
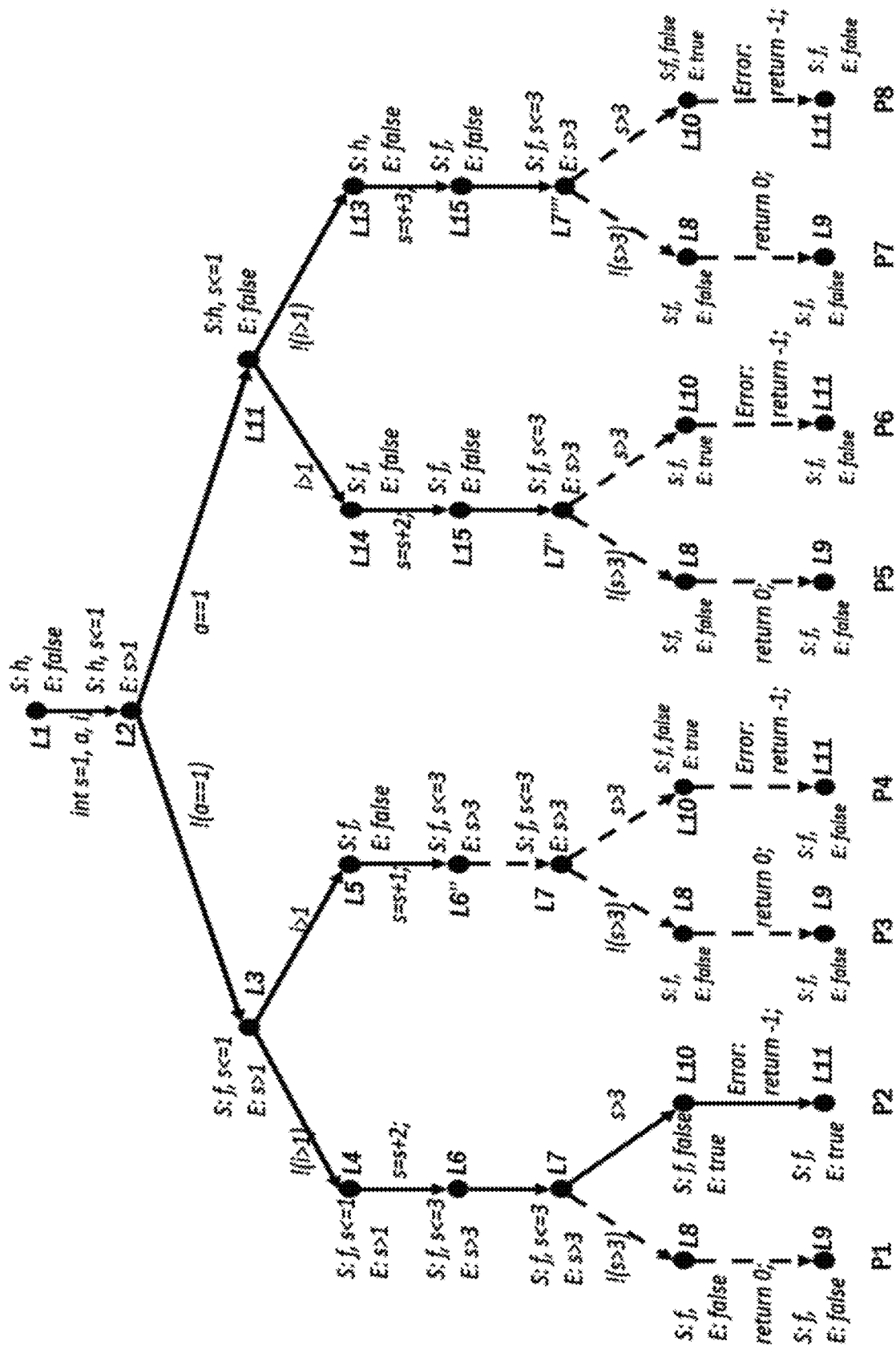

In order to further improve the verification efficiency, the invention uses the optimization strategy to prune the CFG and reduce the state space. First, the corresponding CFG is generated according to the program to be verified. Then, the CFG is pruned and the nodes and edges that is impossible to reach the target node are removed to obtain a new CFG, the attributes of each node and each edge are initialized. The subsequent checking process is as described above. FIG. 8 depicts the traversed paths after the strategy 1 is used. It can be seen that there is no need to traverse path P1.

The S interpolation proposed in the present invention can be used only when the S interpolation is full. In order to accelerate the formation of the full interpolation, the present invention determines the branching order of the traversal by adding the attribute W to the edge, thus the S interpolation can be used in a better way. The effect of the attribute W of the edge is described below with reference to Embodiment 2.

Embodiment 2

Figure 9:
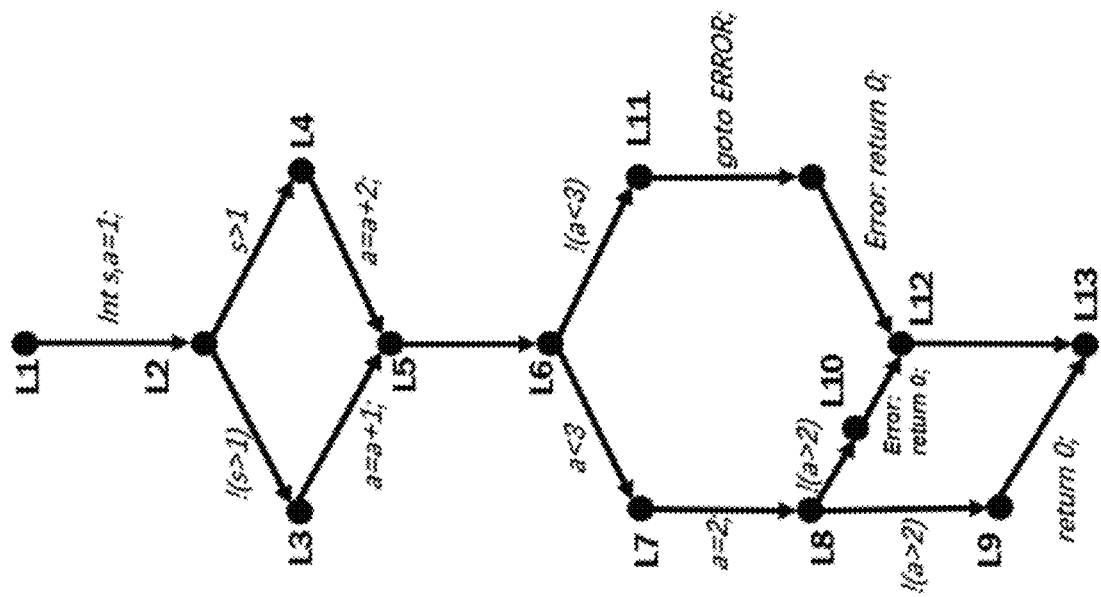
Figure 10:
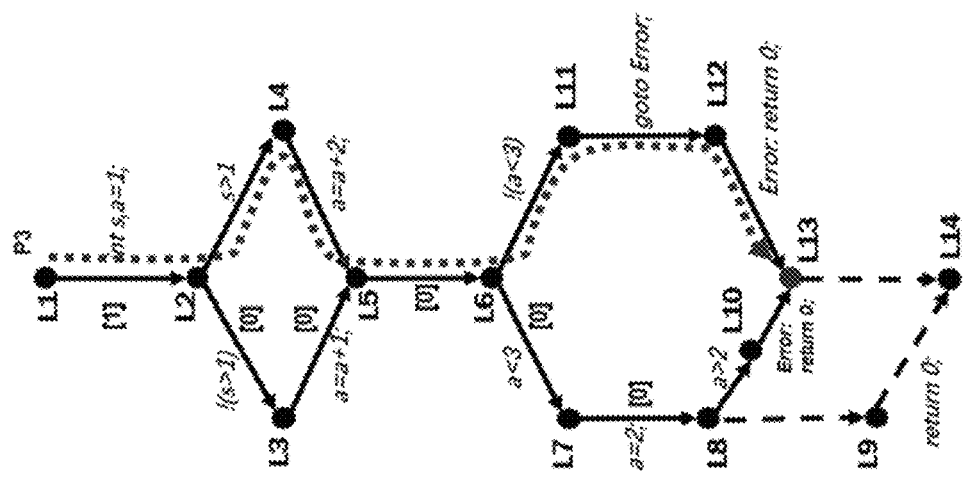
Figure 10:
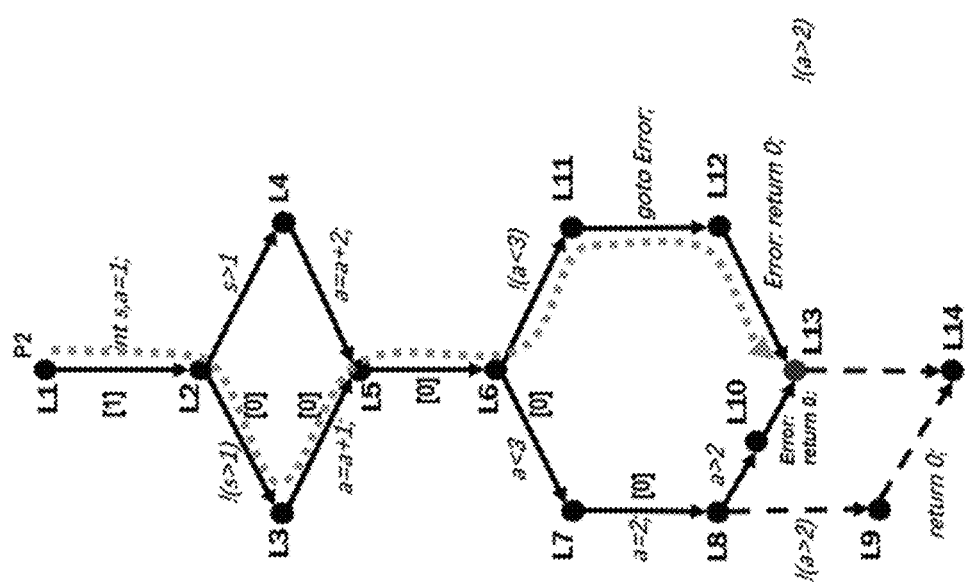
Figure 10:
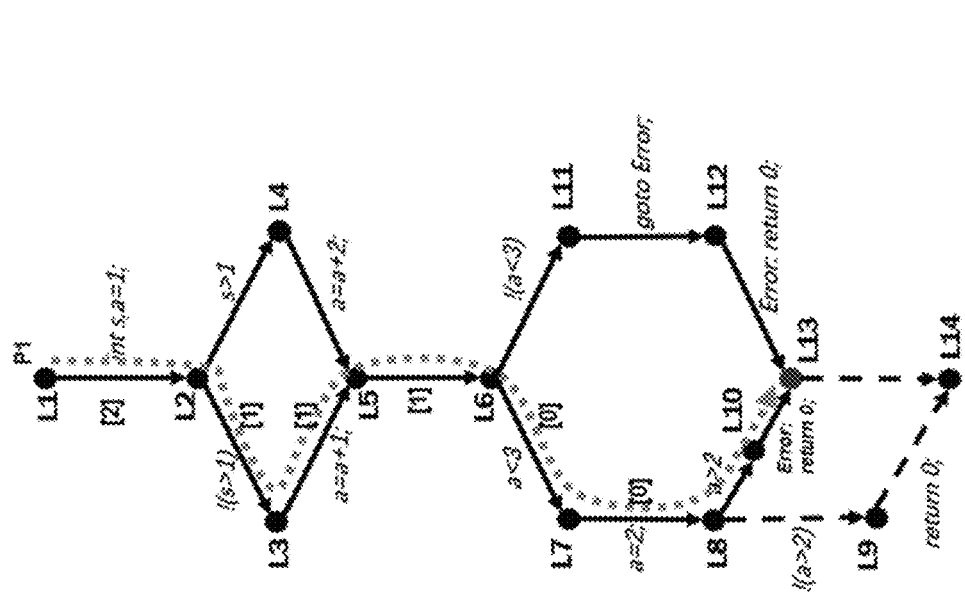

FIG. 9 shows the verified program weight.c and its CFG in Embodiment 2, where the target node is L13 and the endpoint is L4. Whether the program is safe can be determined by verifying the reachability of the target node L13. If L13 is reachable, the program is unsafe. Otherwise, the program is safe. FIG. 10 shows the path traversed with W values. The specific steps are as follows.

In step 1: the CFG is pruned where the useless edges and nodes are removed, represented by broken lines. The attributes of the nodes are initialized, the process of which is the same as that of Embodiment 1. The W values of all the edges are ⊥.

In step 2: as in Embodiment 1, the CFG is extended by using the three types of interpolations to generate ARG. When the first counterexample P1 is found, as shown in FIG. 10(1), three interpolations are computed. Meanwhile, the W values of the edges are computed. Since L10 is unreachable in P1 and L8 is reachable, it starts from edge e: (L7, a=2, L8). Since the outgoing edges of the node L8 pointed by e have been traversed, the W value of e is 0. Similarly, the W values of the other edges are calculated, and the results are shown in FIG. 10 (1).

In step 3: When the ARG is generated for the second time, the path P2 will be traversed first because the priority of W is (>0)>⊥>0, as shown in FIG. 10(2). Since P2 is the spurious counterexample path, the corresponding value is then updated according to the interpolations and W update rules, as shown in FIG. 10(2). When the ARG is generated for the third time, firstly, the traversal is conducted along the path P3 in FIGS. 10(3) and P3 is the real counterexample path. So, the program is unsafe, the verification is ended. When the W value is used, only three paths need to be traversed. Otherwise, four paths need to be traversed.

In conclusion, the present invention belongs to the field of computer application technologies and mainly relates to the field of model checking and program analysis, especially the CEGAR-based abstract model checking method and the application of the SMT theory. Aiming at the problems of low checking efficiency, small verification scale and state space explosion in the existing model checking methods, the invention proposes two new interpolations, which are computed by Craig interpolation, is and applied in software model checking, to classify the paths, alleviate the problem of state space explosion and improve the verification efficiency. The invention can be applied to the safety checking of the software system in the fields of industry, military, scientific research and the like, improving the reliability and safety of the software system. The above is merely the preferred embodiments of the present invention and is not used to limit the present invention. Any modifications, equivalent replacements and improvements made within the spirit and principle of the present invention should be included in the protection scope of the present invention.

We claim:

1. An interpolation based path reduction in software model checking, comprising:

reading a C program, performing grammatical and semantic analysis on the C program, and extracting Control Flow Graph (CFG) from an abstract syntax tree;

adding safety interpolation and error interpolation to the CFG and extending the CFG;

in a process of generating Abstract Reachability Graph (ARG) according to the CFG, checking, in each state, whether the safety interpolation and the error interpolation are implied by current path formula;

wherein the interpolation based path reduction in software model checking further comprises:

step 1: generating the CFG according to a program to be verified, and adding 3 attributes for the nodes in the CFG: R interpolation, S interpolation and E interpolation where R interpolation is a reachable constraint for determining the reachability of a state, S interpolation and E interpolation are path specifications for accelerating verification process; adding an attribute W for an edge of the CFG where the value of W for an edge represents the number of branches that have not been traversed in a sub-graph rooted at the node pointed by the edge;

step 2: generating the ARG by unwinding the CFG, if a new state s is generated along a path and the R interpolation at s is satisfiable, the state s is reachable, then the traversal of the path along s is continued; otherwise, the state s is unreachable, then the path is terminated and other paths are traversed; for a reachable state s, if the E interpolation at the state s is implied by the path formula corresponding to the path, meaning that there is a real counterexample path to a target state along this state and the program is unsafe; if the S interpolation at the state s is implied, meaning that all the paths starting from this state are safe and there is no need to explore the program along the state s; if the state s is reachable and the E interpolation and S interpolation are not implied, then traversing the path along state s;

step 3: if a counterexample path to the target state is found in the process of generating the ARG, then whether the counterexample path is spurious is checked; if the counterexample path is not spurious, the program is unsafe; otherwise, refining the model according to the spurious counterexample, updating the R interpolants, the S interpolants and the E interpolants of the corresponding states, and regenerating the ARG until a real counterexample path is found or no counterexample path exists.

2. The interpolation based path reduction method in software model checking according to claim 1, wherein:

if the error interpolation of a predetermined state is implied, there is a real counterexample path in the program and the program is unsafe, then verification is ended;

if the safety interpolation is implied, all paths rooted at the state are safe and no traversal is needed such that the traversal paths are reduced;

if a spurious counterexample path is found, then the safety interpolation and the error interpolation are computed and updated according to Craig interpolation.

3. The interpolation based path reduction method in software model checking according to claim 1, wherein the step 1 that generates the CFG of the program to be verified and initializes the attributes of the nodes and the edges comprises the following steps:
  (1) finding a target node in the CFG, and reversely traversing the CFG from the target node, then retaining traversed nodes and edges and removing untraversed nodes and edges;
  (2) obtaining pruned CFG, initializing the values of the attributes, that is, three kinds of interpolations for each node, when initially traversing the CFG to generate the ARG, an initial value of the R interpolant for each node is {true}; the S interpolant is defined as a two-tuple: (F, $I_s$) where the range of F is {full, half}, and the value of $I_s$ is a conjunction consisting of predicates; for a node l, if l has no successor nodes or the S interpolants of all successor nodes are full, which is denoted as f, meaning that all successor nodes of l are traversed, and then the S interpolant at l is also full; otherwise, the S interpolation at l is half, which is denoted as h; the form of F(l) is as follows:

$$F(l) = \begin{cases} \text{full} & \text{if } l \text{ has no successors or the } S \\ & \text{interpolants of all successors are full} \\ \text{half} & \text{otherwise} \end{cases}$$

if l is an endpoint, the initial value of the S interpolant is (full, true), meaning that the path is safe if the endpoint is reached; if l is the target node, the value of the S interpolant is (full, false), meaning that the path is a counterexample path if the target node is reached; for other nodes, the initial values of the S interpolants are (half true), the form of $I_s(l)$ is as follows:

$$I_s(l) = \begin{cases} (\text{full, false}) & \text{if } l \text{ is the target node} \\ (\text{full, true}) & \text{if } l \text{ is the endpoint} \\ (\text{half, true}) & \text{otherwise} \end{cases}$$

if l is the target node, the initial value of the E interpolant is true, meaning that the path is a real counterexample; if l is the endpoint, the initial value of the E interpolant is false, meaning that the path is certainly unable to reach the target node; for other nodes, the initial values of the E interpolants are false, initially considered as being unable to reach the target node; for W attribute of each edge, the initial value is $\perp$, meaning that the traversal hasn't started where the range of W is {N+, $\perp$}, and N+ is a set of positive integers.

4. The interpolation based path reduction method in software model checking according to claim 1, where in the step 2, the W attribute is configured to determine an order of traversing the branch edges, and the S interpolation and the E interpolation are configured to improve efficiency of verification, the step 2 further comprises:
  (1) obtaining a reachable state s, and producing successor states according to transition relationship of the CFG; if there are multiple possible successor states, determining the order by the values of W of the edges where the priority of the value of W is: (>0)>$\perp$>0; for some edges that have the same value of W, the order is conducted randomly; for a successor state s, if the state s is unreachable according to the R interpolation, the current path terminates and other paths are explored; if the state s is reachable, checking whether the E interpolant of the state s is false; if the E interpolant of the state s is false, meaning that the successor nodes of s[0] have not been traversed, then the process turns to (2); if the E interpolant of the state s is not false, firstly using SSA principle to assign each variable no more than once to obtain the path formula from the initial state so to s where this path formula is denoted as $P_f(s_0, \ldots, s)$; then, checking whether the E interpolant of s is implied in $P_f(s_0, \ldots, s)$ by using a SMT solver; if the E interpolant of s is implied, a real counterexample exists in the program and the program is unsafe, then the verification terminates; otherwise, the process turns to (2);
  (2) checking whether the S interpolant at s is full interpolant; if the S interpolation at s is not full interpolant, the process turns to (3); if the S interpolation at s is, the path formula from the initial state so to s is obtained, denoted as $P_f(s_0, \ldots, s)$; then checking whether the S interpolant at s is implied in $P_f(s_0, \ldots, s)$ by using an SMT solver; if the S interpolation at s is implied, all paths starting with state s are safe and there is no need to traverse, then the current path terminates and other paths are explored;
  (3) checking whether s is the target state; if s is the target state, a counterexample path is found, then the process turns to step 3; if s is not the target state, further determining whether s is covered by other states; if s is covered by other states, there is no need to explore the current path, and then other paths are explored; if s is not covered by other states, continuing to traverse the current path;
  (4) if there is a reachable state that has not been traversed, the process turns to (1); otherwise, the program is safe and then the verification terminates.

5. The interpolation based path reduction method in software model checking according to claim 1, wherein an optimization strategy in the step 3 comprises:
  in the step 1, generating the CFG corresponding to the program, traversing all the CFG and pruning the nodes and edges that cannot reach the target node according to the target node;
  in the step 3, if a spurious counterexample path exists, the three interpolations and the W value of each edge are computed in a counterexample path;
  in the step 2, if there are more than one successor states for one state, the traversal order of successor states is determined according to the W values of the edges.

6. The interpolation based path reduction method in software model checking according to claim 1, wherein steps of computing the interpolations and W attribute in the step 3 comprise:
  1) when a counterexample path path:$<s_0, e_0, s_1, \ldots, e_{n-1}, s_n>$ is found in the process of generating the ARG, checking whether the path is spurious by using an SMT solver; if path is a real counterexample, the program is unsafe and the verification ends; otherwise, the process turns to 2);
  2) for computing the R interpolant, for the state $s_i$, $0<i<n$, dividing path into two parts: pre and post where pre is $<s_0, \ldots, s_i>$, and post is $<s_i, \ldots, s_n>$; the new R interpolant is computed by Craig interpolation, Craig (pre, post); the R interpolant of $s_i[0]$ is formally expressed as:

$$R\text{-}Intp(s_i[0]) = R\text{-}Intp(s_i[0]) \cup \text{Craig}(P_f(s_0, \ldots, s_i), P_f(s_i, \ldots, s_n))$$

where $P_f(s_0, \ldots, s_i)$ represents the path formula corresponding to the path from $s_0$ to $s_i$;

3) for computing the S interpolation, firstly, a maximal reachable prefix $\Pi=<s_0, \ldots, s_m>$ is found, $0<m<n$, where $s_m$ is reachable and $s_{m+1}$ is unreachable; for each state $s_i$ of $\Pi$, $0<i\leq m$, checking whether the first element of the S interpolant is full or half, if the S interpolants of all successor nodes of $s_i[0]$ is full, then the S interpolant of $s_i[0]$ is full; otherwise, it is half, and the form of $F(s_i[0])$ is as follows:

$$F(s_i[0]) = \begin{cases} \text{full} & \text{if } s_i[0] \text{ has no successors or the } S \text{ interpolants of all successors are full} \\ \text{half} & \text{otherwise} \end{cases}$$

for the second element of the S interpolant, denoted as $I_s(s_i[0])$, if $i=m$, then $I_s(s_i[0])$ is the negation of the path formula of the edge $e_i$; if $0<i<m$, then $I_s(s_i[0])$ is computed by Craig interpolation, denoted as Craig(A, B), where A represents the path formula from $s_0$ to $s_i$, and B is the conjunction of the formula corresponding to the edge $e_i$ and the negation of S interpolant of the state $s_{i+1}$; the form of $I_s(s_i[0])$ is as follows:

$$I_s(s_i[0]) = \begin{cases} I_s(s_i[0]) \wedge \text{Craig}(A, B) & 0 < i < m \\ I_s(s_i[0]) \wedge ! P_f(s_i, e_i, s_{i+1}) & i = m \end{cases}$$

where $A=P_f(s_0, \ldots, s_i)$, and $B=P_f(s_i, e_i, s_{i+1}) \wedge !(I_s(s_{i+1}[0]))$, the interpolation of each state is computed in a reverse order from the state $s_m$ until the initial state is encountered or a certain state is half;

4) for computing the E interpolation, finding a largest feasible suffix $\Pi=<s_i, \ldots, s_n>$, $0<i\leq n$, the E interpolants are computed in a reverse order from the state $s_i$ by Craig interpolation, denoted as Craig(A, B); for $s_i$, A is the conjunction of the path formula from $s_i$ to $s_n$ and the E interpolant of $s_n$, and B is the path formula from $s_0$ to $s_i$; for the state $s_j$, $0<j<i$, A is the conjunction of the path formula from $s_j$ to $s_{j-1}$ and the E interpolant of $s_j$·1, and B is the path formula from $s_0$ to $s_j$; the form of $I_e(s_j[0])$ is as follows:

$I_e(s_j[0]) =$ $$\begin{cases} I_e(s_j[0]) \vee \text{Craig}(A_1, B_1), & j = i \\ \text{where } A_1 = P_f(s_j, \ldots, s_n) \wedge I_e(s_n[0]), & B = P_f(s_0, \ldots, s_j) \\ I_e(s_j[0]) \vee \text{Craig}(A_2, B_2), & 0 < j < i \\ \text{where } A_1 = P_f(s_j, \ldots, s_{j+1}) \wedge I_e(s_{j+1}[0]), & B = P_f(s_0, \ldots, s_j) \end{cases}$$

5) the W value of the edge is computed according to the counterexample path and the updated S interpolation; for an edge e: (s, op, s'), if the S interpolant of s' is full, then the W value of e is 0; if the S interpolant of s' is half, and s' is the last reachable state, then the W value of e is the number of outgoing edges for s'[0] minus one; if the S interpolant of s' is half and s' is not the last reachable state, then the W value of e is a sum of the following two parts: 1) the sum of the W values of edges whose values are not $\bot$ among outgoing edges of s'[0], 2) the number of the edges whose W value is $\bot$ among outgoing edges of s'[0]; for the edge e:(s, op, s'), the form of s':(l', c', p') is as follows:

$$W(e) = \begin{cases} 0 & \text{the } S \text{ interpolation of } l' \text{ is full} \\ |\{(l', -, -) \mid (l', -, -) \text{ is the edge of } l'\}| - 1 & \begin{array}{l} s' \text{ is the last reachable state and} \\ \text{the } S \text{ interpolation of } l' \text{ is half} \end{array} \\ \sum_{W((l',-,-))\neq\bot} W((l', -, -)) + |\{(l', -, -) \mid W((l', -, -)) = \bot\}| & \text{otherwise} \end{cases}$$

6) the process turns to step 2 to regenerate the ARG.

7. The interpolation based path reduction method in software model checking according to claim 6, wherein steps of computing the largest feasible suffix in 4) comprise:
(1) for a counterexample path path: $<s_0, e_0, s_1, \ldots, e_{n-1}, s_n>$, the edges are divided into two categories: branch edge $E_b$ and non-branch edge $E_a$;
(2) generating the path formula corresponding to path, where for $e \in E_b$, the corresponding formula is replaced by true, and for $e \in E_a$, generating its corresponding formula and forming a new path formula $P_f$;
(3) searching reversely from the edge $e_{n-1}$, if $e_{i_1} \in E_b$, $0 < i_1 < n$, then replacing true in the corresponding position in $P_f$ with the formula corresponding to $e_{i_1}$ for obtaining a new path formula $P_f$, and using a SMT solver to check whether $P_f$ is satisfiable; if $P_f$ is satisfiable, then continuing to search for the next edge $e_{i_2} \in E_b$, $0 < i_2 < i_1$, replacing true in the corresponding position in $P_f$ with the formula corresponding to $e_{i_2}$ for obtaining a new path formula $P_f$, and using the SMT solver to check whether $P_f$ is satisfiable; the process is repeated until true is replaced by the formula of $e_{i_m} \in E_b$, and $P_f$ is unsatisfiable for $e_{i_m} \in E_b$, then largest feasible suffix is $<s_{i_{m-1}}, e_{i_{m-1}}, s_{i_{m-2}}, \ldots, e_{n-1}, s_n>$.

8. A non-transient computer readable medium containing program instructions for causing a computer to perform a method for model checking path reduction based on interpolation, wherein the method comprising:
reading a C program, performing grammatical and semantic analysis on the C program, and extracting Control Flow Graph (CFG) from an abstract syntax tree;
adding safety interpolation and error interpolation to the CFG and extending the CFG;
in a process of generating Abstract Reachability Graph (ARG) according to the CFG, checking whether the safety interpolation and the error interpolation are implied by current path formula in each state; and further comprising:
step 1: generating the CFG according to a program to be verified, and adding 3 attributes for the nodes in the CFG: R interpolation, S interpolation and E interpolation, where R interpolation is a reachable constraint for determining reachability of a state, S interpolation and I interpolation are path specifications for accelerating the verification; adding an attribute W for an edge of the CFG, where the value of W for an edge represents the number of branches that have not been traversed in a sub-graph that is rooted at the node pointed by the edge;

step 2: generating the ARG according to the generated CFG: if a new state s is generated along a path and the R interpolation corresponding to s is satisfied, meaning that the state s is reachable, then traversal of the path along the state s is continued; otherwise, the state s is unreachable, then the path is terminated and other paths are traversed; for a reachable state s, if the E interpolation corresponding to the state s is implied by the path formula corresponding to the path, meaning that there is a counterexample path from the state s to a target state and the program is unsafe; if the S interpolation corresponding to the state s is implied, meaning that all the paths starting from this state are safe and there is no need to explore the program along the state s; if the state s is reachable and the E interpolation and S interpolation are not implied, then continuing to traversing the path along state s;

step 3: if a counterexample path is found in the process of generating ARG, then checking whether the counterexample path is spurious: if the counter example path is spurious, meaning that the program is unsafe; otherwise, refining the model according to the spurious counterexample, updating the R interpolation, the S interpolation and the E interpolation of the corresponding state, and then regenerating the ARG until a real counterexample path is found or no counterexample paths exist.

9. The non-transient computer-readable medium according to claim 8, wherein:
if the error interpolant of a predetermined state is implied, meaning that there is a real counterexample path in the program and the program is unsafe, then verification is ended;
if the safety interpolation is implied, meaning that all paths rooted at the state are safe and no traversal is needed such that the traversal paths are reduced;
if a spurious counterexample path is found, then the safety interpolation and the error interpolation are computed and updated according to Craig interpolation.

10. The non-transient computer-readable medium according to claim 8, wherein the step 1 that generates the CFG of the program to be verified and initializes the attributes of the node and the edge comprises the following steps:
(1) finding a target node in the CFG, reversely traversing the CFG from the target node, and then retaining traversed nodes and edges and removing untraversed nodes and edges;
(2) obtaining pruned CFG, and initializing the value of the attributes and three kinds of interpolations for each node; an initial value of the R interpolant for each node is {true} when generating initially the ARG by traversing the CFG; the S interpolant is defined as a two-tuple: (F, $I_s$) where the range of F is {full, half}, the value of $I_s$ is a conjunction of predicates: for a node l, if l has no successors or the S interpolants of all successor nodes are full, which is denoted as f, meaning that all successor nodes of l are traversed, and then the S interpolant at l is also full; otherwise, the S interpolation at l is half, which is denoted as h; the form of F(l) is as follows:

$$F(l) = \begin{cases} \text{full} & \text{if } l \text{ has no successors or the } S \\ & \text{interpolants of all successors are full} \\ \text{half} & \text{otherwise} \end{cases}$$

if l is an endpoint, the initial value of the S interpolant is (full, true), meaning that the path is certainly safe if the endpoint is reached; if l is the target node, the value of the S interpolant is (full, false), meaning that the path is a counterexample path if the target node is reached; for other nodes, the S interpolants are (half true), the form of $I_s(l)$ is as follows:

$$I_s(l) = \begin{cases} (\text{full, false}) & \text{if } l \text{ is the target node} \\ (\text{full, true}) & \text{if } l \text{ is the endpoint} \\ (\text{half, true}) & \text{otherwise} \end{cases}$$

if l is the target node, the initial value of the E interpolant is true, meaning that the path is certainly a real counterexample; if l is the endpoint, the initial value of the E interpolant is false, meaning that the path is certainly unable to reach the target node; for other nodes, the E interpolants are false, initially considered as being unable to reach the target node; for W attribute of each edge, the initial value is $\perp$, meaning that the traversal has not started, where the range of W is $\{N+, \perp\}$, $N+$ is a set of positive integers.

11. The non-transient computer-readable medium according to claim 8, wherein in the step 2, the W attribute is configured to determine an order of traversing the branch edges, and the S interpolation and the E interpolation are configured to improve efficiency of the verification, further comprising:
(1) obtaining a reachable state s' and producing successor states according to transition relationship of the CFG; if there are multiple possible successors, determining the order by the values of W of the edges where the priority of the value of W of the edge is: $(>0)>\perp>0$; for the edges that have the same value of W, the selection is conducted randomly: for a successor state s, if the state s is unreachable according to the R interpolation, ending the current path and continuing to traverse other paths; if the state s is reachable, checking whether the E interpolant at the state s is false; if the E interpolant at s is false, meaning that the successor node of s[0] hasn't been traversed, then the next step turns to (2); otherwise, firstly using SSA principle to assign each variable no more than once for obtaining the path formula from the initial state $s_0$ to s where this path formula is denoted as $P_f(s_0, \ldots, s)$; then, checking whether the E interpolant at s is implied in $P_f(s_0, \ldots, s)$ by using a solver; if the E interpolant at s is implied, meaning that a real counterexample exists in the program and the program is unsafe, then the verification path terminates; otherwise, turning to (2);
(2) checking whether the S interpolant of s is full interpolant; if the S interpolant of s is not full, the next step turns to (3); if the S interpolant of s is, the path formula from the initial state $s_0$ to s is obtained, denoted as $P_f(s_0, \ldots, s)$; then checking whether the S interpolant of s is implied by $P_f(s_0, \ldots, s)$ by using a solver; if the S interpolant of s is implied, all paths starting with s are safe and there is no need to traverse, then the current path terminates and continuing to traverse other paths;

(3) determining whether s is the target state; if s is the target state, a counterexample path is found, then step 3 is executed; if s is not the target state, further checking whether s is covered by other states; if s is covered by other states, there is no need to explore the current path, then other paths are explored; otherwise, continuing to traverse the current path;

(4) if there is a reachable state that has not been traversed, turning to (1); otherwise, the program is safe and then the verification terminates.

12. The non-transient computer-readable medium according to claim 8, wherein an optimization strategy in the step 3 comprises:

in the step 1, the CFG of a program is generated, and the nodes and edges that do not reach the target node are pruned;

in the step 3, if a spurious counterexample path exists, both of the three interpolants and the W value of each edge are computed;

in the step 2, if a state has more than one successors, determining a traversal order of the successor states by the W value.

13. The non-transient computer-readable medium according to claim 8, wherein steps of computing the interpolations and W attribute in the step 3 comprise:

1) in the process of generating the ARG, a counterexample path path:$<s_0, e_0, s_1, \ldots, e_{n-1}, s_n>$ is found; then checking whether the path is spurious by an SMT solver; if the path is not spurious, the program is unsafe and the verification ends; otherwise, turning to 2);

2) computing the R interpolant, for the state $s_i$, $0<i<n$, dividing path into two parts: pre and post where pre is $<s_0, \ldots, s_i>$ and post is $<s_1, \ldots, s_n>$; the new R interpolants are computed by Craig interpolation, Craig (pre, post); the update of the R interpolant of $s_i[0]$ is formally expressed as:

$$R\text{-}Intp(s_i[0]) = R\text{-}Intp(s_i[0]) \cup Craig(P_f(s_0, \ldots, s_i), P_f(s_i, \ldots, s_n))$$

where $P_f(s_0, \ldots, s_i)$ represents the path formula corresponding to the path from $s_0$ to $s_i$;

3) for computing the S interpolant, firstly, finding a maximal reachable sequence $\Pi = <s_0, \ldots, s_m>$, $0<m<n$, where the state $s_m$ is reachable and the state $s_{m+1}$ is unreachable; for each state $s_i$ of $\Pi$, $0<i\leq m$, checking whether the first element of the S interpolant is full or half, if the S interpolants of all successor nodes of $s_i[0]$ are full, then the S interpolant of $s_i[0]$ is full; otherwise, the S interpolant of $s_i[0]$ is half; the form of $F(s_i[0])$ is as follows:

$$F(s_i[0]) = \begin{cases} \text{full} & \text{if } s_i[0] \text{ has no successors or the } S \\ & \text{interpolants of all successors are full} \\ \text{half} & \text{otherwise} \end{cases}$$

for the second element of the S interpolation as $I_s(s_i[0])$, if $i=m$, then $I_s(s_i[0])$ is the negation of the path formula of the edge $e_i$; if $0<i<m$, then $I_s(s_i[0])$ is computed by Craig interpolation, denoted as Craig(A, B), where A represents the path formula from $s_0$ to $s_i$, and B is the conjunction of the formula corresponding to the edge $e_i$ and the negation of S interpolant at the state $s_{i-1}$; the form of $I_s(s_i[0])$ is as follows:

$$I_s(s_i[0]) = \begin{cases} I_s(s_i[0]) \wedge Craig(A, B) & 0 < i < m \\ I_s(s_i[0]) \wedge !P_f(s_i, e_i, s_{i+1}) & i = m \end{cases}$$

where $A = P_f(s_0, \ldots, s_i)$, $B = P_f(s_i, e_i, s_{i-1}) \wedge !(I_s(s_{i-1}[0]))$, and the interpolation of each state is computed in a reverse order from the state $s_m$ until the initial state is encountered or the S interpolant at a certain state is half;

4) for computing the E interpolant, a largest feasible suffix $\Pi = <s_i, \ldots, s_n>$, $0<i\leq n$; the E interpolants are computed in a reverse order from the state $s_i$ by Craig interpolation, denoted as Craig(A, B); for $s_i$, A is the conjunction of the path formula from $s_i$ to $s_n$ and the E interpolant of $s_n$, and B is the path formula from $s_0$ to $s_i$; for the state $s_j$, $0<j<i$, A is the conjunction of the path formula from $s_j$ to $s_{j-1}$ and the E interpolant of $s_{j+1}$, and B is the path formula from $s_0$ to $s_j$; the form of $I_e(s_j[0])$ is as follows:

$$I_e(s_j[0]) = \begin{cases} I_e(s_j[0]) \vee Craig(A_1, B_1), & j = i \\ \text{where } A_1 = P_f(s_j, \ldots, s_n) \wedge I_e(s_n[0]), & B = P_f(s_0, \ldots, s_j) \\ I_e(s_j[0]) \vee Craig(A_2, B_2), & 0 < j < i \\ \text{where } A_1 = P_f(s_j, \ldots, s_{j+1}) \wedge I_e(s_{j+1}[0]), & B = P_f(s_0, \ldots, s_j) \end{cases}$$

5) for the W value of the edge, it is computed according to the counterexample path and the updated S interpolation, for an edge e: (s, op, s'), if the S interpolant of s' is full, then the W value of e is 0; if the S interpolant of s' is half, and s' is the last reachable state, then the W value of e is the number of outgoing edges for s'[0] minus one: if the S interpolant of s' is half and s' is not the last reachable state, then the W value of e is a sum of the two parts: 1) the sum of the W values of edges whose values are not $\bot$ among outgoing edges of s'[0], 2) the number of the edges whose W values are $\bot$ among outgoing edges of s'[0]; for the edge e:(s, op, s'), the form of s':(l', c', p') is as follows:

$$W(e) = \begin{cases} 0 & \text{the } S \text{ interpolation of } l' \text{ is full} \\ |\{(l', -, -) \mid (l', -, -) \text{ is the edge of } l'\}| - 1 & s' \text{ is the last reachable state and} \\ & \text{the } S \text{ interpolation of } l' \text{ is half} \\ \sum_{W((l', -, -)) \neq \bot} W((l', -, -)) + |\{(l', -, -) \mid W((l', -, -)) = \bot\}| & \text{otherwise} \end{cases}$$

6) turning to step 2 to regenerate the ARG.

14. The non-transient computer-readable medium according to claim 13, wherein steps of computing the largest effective post subsequence in 4) comprise:
- (1) for a counterexample path path: $<s_0, e_0, s_1, \ldots, e_{n-1}, s_n>$, the edges are divided into two categories: branch edge $E_b$ and non-branch edge $E_a$;
- (2) the path formula is generated, where for $e \in E_b$, the corresponding formula is replaced by true, and for $e \in E_a$, its corresponding formula is generated and a new path formula $P_f$ is obtained;
- (3) searching reversely from the edge $e_{n-1}$, if $e_{i_1} \in E_b$, $0 < i_1 < n$, then replacing true in the corresponding position in $P_f$ with the formula corresponding to $e_{i_1}$ for obtaining a new path formula $P_f$, and using an SMT solver to check whether $P_f$ is satisfiable; if $P_f$ is satisfied, then continuing to search for the next edge $e_{i_2}$, $0 < i_2 < i_1$, and replacing true in the corresponding position in $P_f$ with the formula corresponding to $e_{i_2}$ for obtaining a new path formula $P_f$, and using the SMT solver to check whether $P_f$ is satisfiable; the process is repeated until $P_f$ is unsatisfiable by the SMT solver for $e_{i_m} \in E_b$, then the largest feasible suffix is $<s_{i_{m-1}}, e_{i_{m-1}}, s_{i_{m-2}}, \ldots, e_{n-1}, s_n>$.

* * * * *